US012638645B2

(12) United States Patent
Huang et al.

(10) Patent No.: US 12,638,645 B2
(45) Date of Patent: May 26, 2026

(54) PHOTONIC PACKAGE AND METHOD FOR FORMING THE SAME

(71) Applicant: Taiwan Semiconductor Manufacturing Company, Ltd., Hsinchu (TW)

(72) Inventors: Yu-Yi Huang, Taipei City (TW); Yu-Hao Kuo, Hsinchu County (TW); Chiao-Chun Chang, Hsinchu County (TW); Jui-Hsuan Tsai, Taipei City (TW); Yu-Hung Lin, Taichung City (TW); Shih-Peng Tai, Xinpu Township, Hsinchu County (TW); Jih-Churng Twu, Hsinchu County (TW); Chen-Hua Yu, Hsinchu City (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 230 days.

(21) Appl. No.: 18/447,835

(22) Filed: Aug. 10, 2023

(65) Prior Publication Data

US 2025/0052966 A1     Feb. 13, 2025

(51) Int. Cl.
*G02B 6/42* (2006.01)

(52) U.S. Cl.
CPC ......... *G02B 6/4283* (2013.01); *G02B 6/4207* (2013.01); *G02B 6/4293* (2013.01)

(58) Field of Classification Search
None
See application file for complete search history.

(56) References Cited

U.S. PATENT DOCUMENTS

2021/0193564 A1*  6/2021  Song ......................... G02B 6/43

* cited by examiner

*Primary Examiner* — Chad H Smith
(74) *Attorney, Agent, or Firm* — Birch, Stewart, Kolasch & Birch, LLP

(57) ABSTRACT

A method of forming a semiconductor package is provided. The method includes forming a micro lens recessed from the top surface of a substrate. A concave area is formed between the surface of the micro lens and the top surface of the substrate. The method includes depositing a first dielectric material that fills a portion of the concave area using a spin coating process. The method includes depositing a second dielectric material that fills the remainder of the concave area and covers the top surface of the substrate using a chemical vapor deposition process. The method includes planarizing the second dielectric material. The method includes forming a bonding layer on the planarized second dielectric material and over the top surface of the substrate. The method includes bonding a semiconductor wafer to the substrate via the bonding layer.

20 Claims, 28 Drawing Sheets

102A
102B
102C

102

PHOTONIC PACKAGE AND METHOD FOR FORMING THE SAME

BACKGROUND

One technique for signal transmission and processing is electrical signaling and processing. In addition, optical signaling and processing has been used in an increasing number of applications in recent years, particularly due to the use of optical fiber-related applications for signal transmission.

Optical signaling and processing are typically combined with electrical signaling and processing to provide full-fledged applications. For example, optical fibers may be used for long-range signal transmission, and electrical signals may be used for short-range signal transmission as well as for processing and control. Accordingly, devices that integrate optical components and electrical components are produced to convert between optical signals and electrical signals, as well as for the processing of optical signals and electrical signals. Packages (also referred to as photonic packages) may thus include both optical (photonic) dies including optical devices and electronic dies including electronic devices. However, there are many challenges in the fabrication of photonic packages.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

FIG. 10-1 illustrates a cross-sectional view of an intermediate stage in the formation of a photonic package, in accordance with some embodiments.

FIG. 24-1 illustrates a cross-sectional view of an intermediate stage in the formation of a photonic package, in accordance with some embodiments.

DETAILED DESCRIPTION

Figure 1:
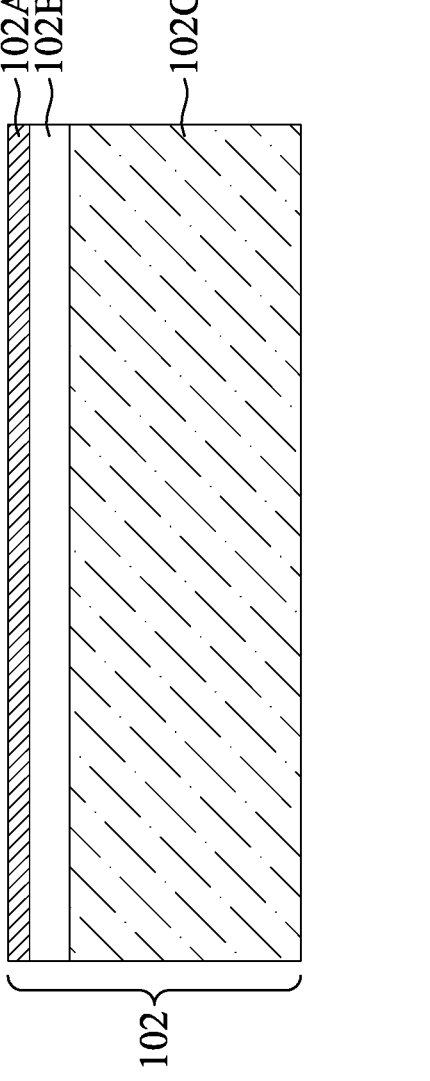
FIGS. 1 to 16 illustrate cross-sectional views of intermediate stages in the formation of a photonic package, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The system may be otherwise oriented (rotated 90 degrees or at other orientations) and the spatially relative descriptors used herein may likewise be interpreted accordingly.

A photonic package and the method for forming the same are provided in accordance with some embodiments of the present disclosure. The photonic package may include a lens substrate and a semiconductor wafer bonded to the lens substrate, wherein the lens substrate may include a recessed micro lens that is optically coupled with an optical component within the semiconductor wafer. In some embodiments, during formation of the lens substrate, the concave area (or gap) of the micro lens may be partially filled with a first dielectric material formed by a spin coating process, and then completely filled with a second dielectric material formed by a chemical vapor deposition (CVD) process. In this manner, the first dielectric material can effectively reduce the surface topography (i.e., surface height difference) of the top surface of the lens substrate due to the fluidity of the spin coating process. Consequently, the subsequently formed second dielectric material can have a corresponding reduced surface topography, which helps to improve the performance of the subsequent planarization process (e.g., process time and cost can be reduced). In some other embodiments, during formation of the lens substrate, the concave area of the micro lens may be filled with only a single photosensitive dielectric material formed by a spin coating process. In this manner, the photosensitive dielectric material can also effectively reduce the surface topography (i.e., surface height difference) of the top surface of the lens substrate due to the fluidity of the spin coating process, and the planarization region of the photosensitive dielectric material can be pre-defined by a photopatterning process. Therefore, the gap-filling process is simplified and performance of the subsequent planarization process is improved.

The Embodiments discussed herein provide examples to enable making or using the subject matter of this disclosure, and a person having ordinary skill in the art will readily understand that modifications can be made while remaining within the contemplated scope of different embodiments. Throughout the various views and illustrative embodiments, like reference numbers are used to designate like elements. Although method embodiments may be discussed as being performed in a particular order, other method embodiments may be performed in any logical order.

FIGS. 1 to 16 illustrate cross-sectional views of intermediate stages in the formation of a photonic package 10 (see FIG. 16), in accordance with some embodiments. In some cases, the photonic package 10 may be part of a semiconductor package or another structure. The photonic package 10 may provide an input/output (I/O) interface between optical signals and electrical signals in a semiconductor package. In some embodiments, the photonic package 10 provides an optical network for signal communication between components (e.g., photonic components, integrated circuits, couplings to external fibers, etc.) within the photonic package 10. In some cases, the photonic package 10 may be considered an "optical engine."

Referring first to FIG. 1, a buried oxide ("BOX") substrate 102 is provided, in accordance with some embodiments. The BOX substrate 102 includes an oxide layer 102B formed over a substrate 102C, and a silicon layer 102A formed over the oxide layer 102B. The oxide layer 102B may be formed of or comprise, for example, a silicon oxide or the like. The substrate 102C may include a material such as glass, ceramic, dielectric, semiconductor, the like, or a combination thereof. In some embodiments, the substrate 102C is a semiconductor substrate, such as a bulk semiconductor substrate or the like, which may be doped or undoped. In some embodiments, the semiconductor material of the substrate 102C may include silicon; germanium; a compound semiconductor including silicon carbide, gallium arsenic, gallium phosphide, indium phosphide, indium arsenide, and/or indium antimonide; an alloy semiconductor including silicon germanium, gallium arsenide phosphide, aluminum indium arsenide, aluminum gallium arsenide, gallium indium arsenide, gallium indium phosphide, and/or gallium indium arsenide phosphide; or a combination thereof. In the embodiment shown in FIG. 1, the substrate 102C is a wafer, such as a silicon wafer. The substrate/wafer 102C includes an edge portion (not shown in FIG. 1, and shown in dashed line in FIG. 5), and the edge portion forms a fully ring when viewed from top. In other embodiments, other substrates, such as a multi-layered or gradient substrate may also be used.

Figure 2:
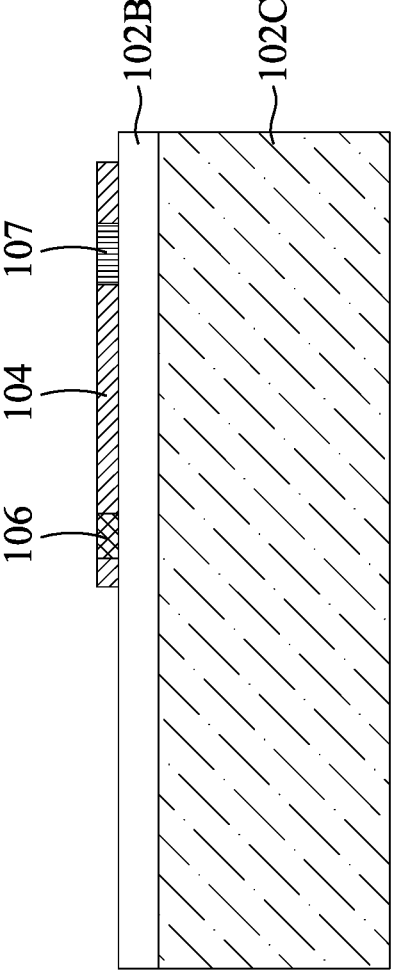

In FIG. 2, the silicon layer 102A is patterned to form silicon regions for waveguides 104, photonic components 106, and grating couplers 107 (only one waveguide 104, one photonic component 106 and one grating coupler 107 are shown), in accordance with some embodiments. In this manner, the silicon layer 102A may be considered an "optical layer" in some cases. The silicon layer 102A may be patterned using suitable photolithography and etching techniques. For example, a hard mask layer (e.g., a nitride layer or the like, not shown) may be formed over the silicon layer 102A and patterned, in some embodiments. The pattern of the hard mask layer may then be transferred to the silicon layer 102A using an etching process. The etching process may include a dry etching process and/or a wet etching process, which may include an anisotropic process. In some embodiments, more than one photolithography and etching process may be used in order to pattern the silicon layer 102A.

The waveguides 104 may be patterned from the silicon layer 102A. For example, the silicon layer 102A may be etched to form recesses defining the waveguides 104, with sidewalls of the remaining unrecessed portions defining the sidewalls of the waveguides 104. In some embodiments where multiple waveguides 104 are formed, the multiple waveguides 104 may be separate waveguides 104 or connected as a single continuous structure. In some embodiments, one or more of the waveguides 104 form a continuous loop.

The photonic components 106 may be integrated with the waveguides 104, and may be formed with the silicon waveguides 104. The photonic components 106 may be optically coupled to the waveguides 104 and may interact with optical signals within the waveguides 104. The photonic components 106 may include, for example, photonic devices such as photodetectors, modulators, other photonic devices, or the like. For example, a photodetector may be optically coupled to the waveguides 104 to detect optical signals within the waveguides 104 and generate electrical signals corresponding to the optical signals. As another example, a modulator may be optically coupled to the waveguides 104 to receive electrical signals and generate corresponding optical signals within the waveguides 104 by modulating optical power within the waveguides 104. In this manner, the photonic components 106 can facilitate the input/output (I/O) of optical signals to and from the waveguides 104. In other embodiments, the photonic components may include other active or passive components, such as laser diodes, optical signal splitters, phase shifters, interferometers, oscillators, or other types of photonic structures or devices.

In some embodiments, photodetectors may be formed by partially etching regions of the waveguides 104 and growing epitaxial material on the remaining silicon of the etched regions. The waveguides 104 may be etched using acceptable photolithography and etching techniques. The epitaxial material may comprise, for example, a semiconductor material such as germanium, which may be doped or undoped. In some embodiments, an implantation process may be performed to introduce dopants (e.g., p-type dopants, n-type dopants, or a combination) within the silicon of the etched regions as part of the formation of the photodetectors. In some embodiments, modulators may be formed by, for example, partially etching regions of the waveguides 104 and then implanting appropriate dopants (e.g., p-type dopants, n-type dopants, or a combination) within the remaining silicon of the etched regions. In some embodiments, the etched regions used for the photodetectors and the etched regions used for the modulators may be formed using one or more of the same photolithography or etching step. In some embodiments, the etched regions used for the photodetectors and the etched regions used for the modulators may be implanted using one or more of the same implantation steps.

The grating couplers 107 may be formed with the waveguides 104. The grating couplers 107 are photonic structures that allow optical signals and/or optical power to be transferred between the waveguides 104 and another photonic component, such as a vertically-mounted optical fiber (e.g., the optical fiber 316 shown in FIG. 16) or a waveguide of another photonic system. The grating couplers 107 may be formed using acceptable photolithography and etching techniques. In some embodiments, the grating couplers 107 are formed after the waveguides 104 are defined. For example, a photoresist may be formed on the waveguides 104 and patterned, with the pattern of the photoresist corresponding to the grating couplers 107. One or more etching processes may then be performed on the waveguides 104 using the patterned photoresist as an etching mask to form the grating couplers 107. The etching processes may include one or more dry etching processes and/or wet etching processes, which may include anisotropic processes.

Figure 14:
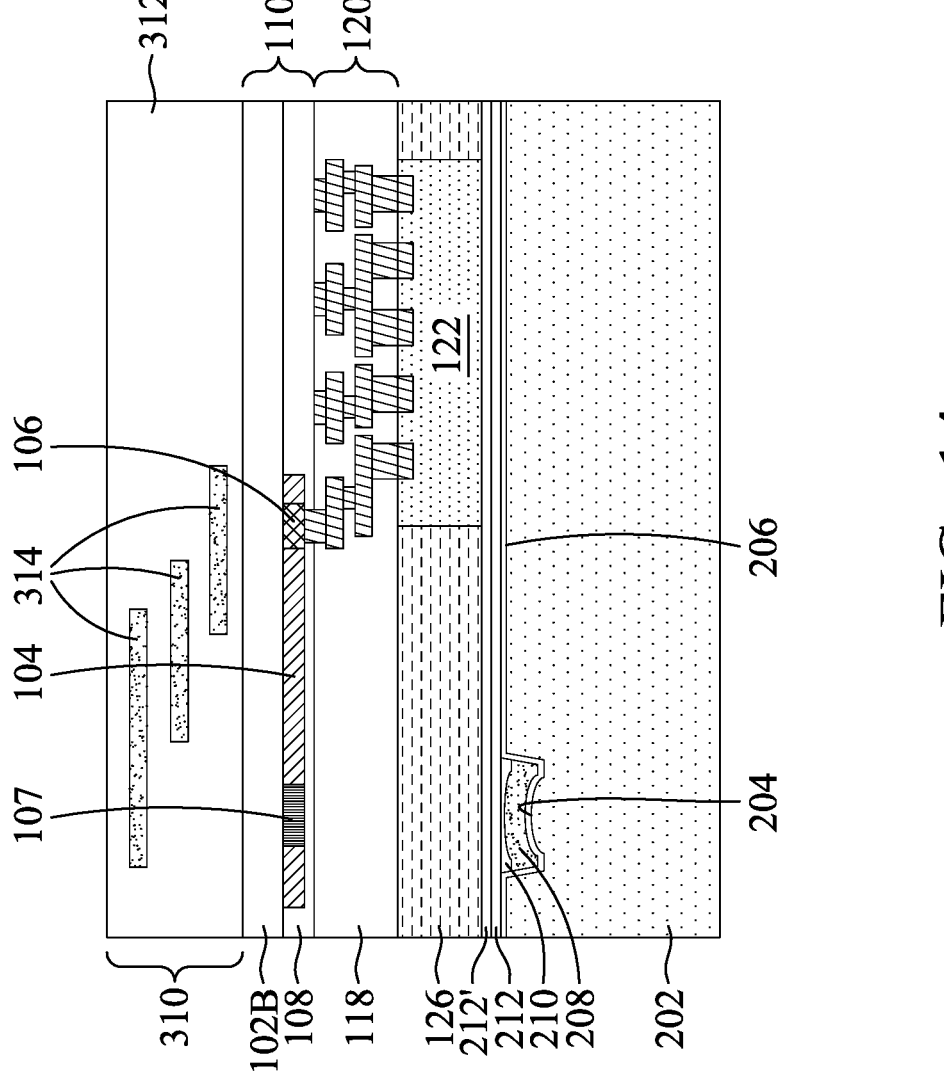

In some embodiments, other types of couplers (not shown for simplicity) may be formed, such as a structure that couples optical signals between the waveguides 104 and other waveguides of the photonic package 10 (e.g., the nitride waveguides 314 shown in FIG. 14). Edge couplers (not shown for simplicity) may also be formed that allow optical signals and/or optical power to be transferred between the waveguide 104 and a photonic component (not shown in the figures) that is horizontally mounted to a sidewall of the photonic package 10, in some embodiments. These and other photonic structures are considered within the scope of the present disclosure.

In some cases, the waveguides 104, the photonic components 106 and the grating couplers 107 may be collectively referred to as a "photonic layer" or as a "photonic integrated circuit (PIC)." Other configurations or arrangements of the waveguides 104, the photonic components 106 and/or the grating couplers 107 are also possible, and are not limited to those shown in FIG. 2.

Figure 3:
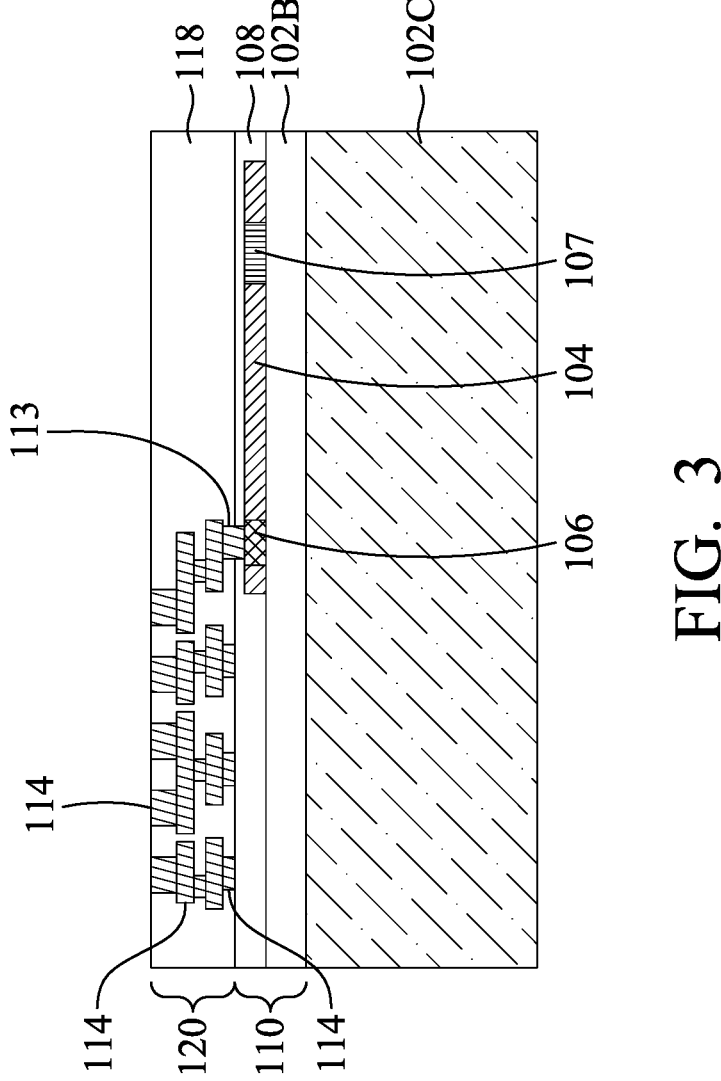

In FIG. 3, a dielectric layer 108 is formed on the front side (e.g., the side facing upwards in FIG. 3) of the BOX substrate 102 to form a photonic routing structure 110, in accordance with some embodiments. The dielectric layer 108 is formed over the waveguides 104, the photonic components 106, the grating couplers 107, and the oxide layer 102B. The dielectric layer 108 may be formed of one or more layers of silicon oxide, silicon nitride, the like, or a combination thereof, and may be formed by any acceptable deposition process, such as chemical vapor deposition (CVD), physical vapor deposition (PVD), atomic layer deposition (ALD), laminating, the like, or a combination thereof. Other suitable dielectric materials formed by any acceptable process may be used.

In some embodiments, the dielectric layer 108 is then thinned using a planarization process such as a chemical-mechanical polish (CMP) process, a grinding process, or the like. In some cases, a thinner dielectric layer 108 may allow for more efficient optical coupling between a grating coupler 107 and a vertically-mounted photonic component (e.g., the optical fiber 316 shown in FIG. 16). In other embodiments, the planarization process may expose surfaces of the waveguides 104, the photonic components 106, and/or the grating couplers 107.

Due to the difference in refractive indices of the materials of the waveguides 104 and dielectric layer 108, the waveguides 104 have high internal reflections so that light is substantially confined within the waveguides 104, depending on the wavelength of the light and the refractive indices of the respective materials. In some embodiments, the refractive index of the material of the waveguides 104 is higher than the refractive index of the material of the dielectric layer 108. For example, the waveguides 104 may comprise silicon, and the dielectric layer 108 may comprise silicon oxide and/or silicon nitride. Accordingly, the waveguides 104 may be referred to as "silicon waveguides" herein.

Still referring to FIG. 3, a redistribution structure 120 is formed over the dielectric layer 108, in accordance with some embodiments. The redistribution structure 120 is an interconnect structure that includes one or more dielectric layers (collectively referred to as "dielectric layers 118") and includes conductive features 114 formed in the dielectric layers 118 that provide interconnections and electrical routing. For example, conductive features 114 of the redistribution structure 120 may provide electrical connection to underlying features such as photonic components 106 and vias 127 (see FIG. 16) and/or overlying features such as electronic dies 122 (see FIG. 4).

The dielectric layers 118 may be, for example, insulating or passivation layers, and may comprise one or more materials similar to those described above for the dielectric layer 108, such as a silicon oxide or a silicon nitride, or may comprise a different material. The dielectric layers 118 and/or the dielectric layer 108 may be transparent or nearly transparent to light at wavelengths suitable for transmitting optical signals or optical power between the grating coupler 107 and a vertically-mounted optical fiber (e.g., the optical fiber 316 shown in FIG. 16). The dielectric layers 118 may be formed using a technique similar to those described above for the dielectric layer 108 or using a different technique.

The conductive features 114 may include conductive lines and vias, and may be formed by a damascene process, e.g., single damascene, duel damascene, or the like. For example, the conductive features 114 may be formed by depositing a dielectric layer 118 and then forming openings extending through the dielectric layer 118. The openings may be formed using acceptable photolithography and etching techniques. A conductive material may then be formed in the openings, thereby forming conductive features 114 in the dielectric layer 118, in accordance with some embodiments. In some embodiments, a liner (not shown), such as a diffusion barrier layer (e.g., a layer made of tantalum, tantalum nitride, titanium, titanium nitride, etc.), may be formed in the openings, and may be formed using a suitable deposition process such as ALD or the like. In some embodiments, a seed layer (not shown), which may include copper or a copper alloy, may then be deposited in the openings. The conductive material of the conductive features 114 may be formed in the openings using, for example, a plating process. The conductive material may include, for example, a metal or a metal alloy such as copper, silver, gold, tungsten, cobalt, aluminum, or alloys thereof. A planarization process (e.g., a CMP process or a grinding process) may be performed to remove excess conductive material along the top surface of the dielectric layer 118, so that top surfaces of the conductive features 114 and dielectric layer 118 are level. Another dielectric layer 118 may then be deposited over the conductive features 114, and a similar process may be performed to form additional conductive features 114. In this manner, the process may be repeated to form multiple layers of dielectric layers 118 and conductive features 114. The conductive features 114 may be formed using other techniques or materials in other embodiments.

In some embodiments, the top-most conductive features 114 of the redistribution structure 120 may include conductive pads, bonding pads, or the like. The top-most conductive features 114 may be formed in the top-most dielectric layer 118 of the redistribution structure 120. A planarization process (e.g., a CMP process or the like) may be performed after forming the top-most conductive features 114 so that the surfaces of the top-most conductive features 114 and top-most dielectric layer 118 are substantially level or coplanar. In some embodiments, the bottom-most conductive features 114 of the redistribution structure 120 may include conductive pads or the like. The bottom-most conductive features 114 may be formed in the bottom-most dielectric layer 118 of the redistribution structure 120. The redistribution structure 120 may include more or fewer dielectric layers 118 or conductive features 114 than shown in FIG. 3.

In some embodiments, the bottom-most conductive features 114 of the redistribution structure 120 also include contacts 113 that extend through the dielectric layer 108 and are electrically connected to the photonic components 106. The contacts 113 allow electrical power or electrical signals to be transmitted to the photonic components 106 and electrical signals to be transmitted from the photonic components 106. In this manner, the photonic components 106 may convert electrical signals into optical signals transmitted by the waveguides 104, and/or may convert optical signals from the waveguides 104 into electrical signals. The contacts 113 may be formed before or after formation of the other bottom-most conductive features 114 of the redistribution structure 120. In some embodiments, the contacts 113 may be formed using techniques or materials similar to those described above for the other bottom-most conductive features 114.

Figure 4:
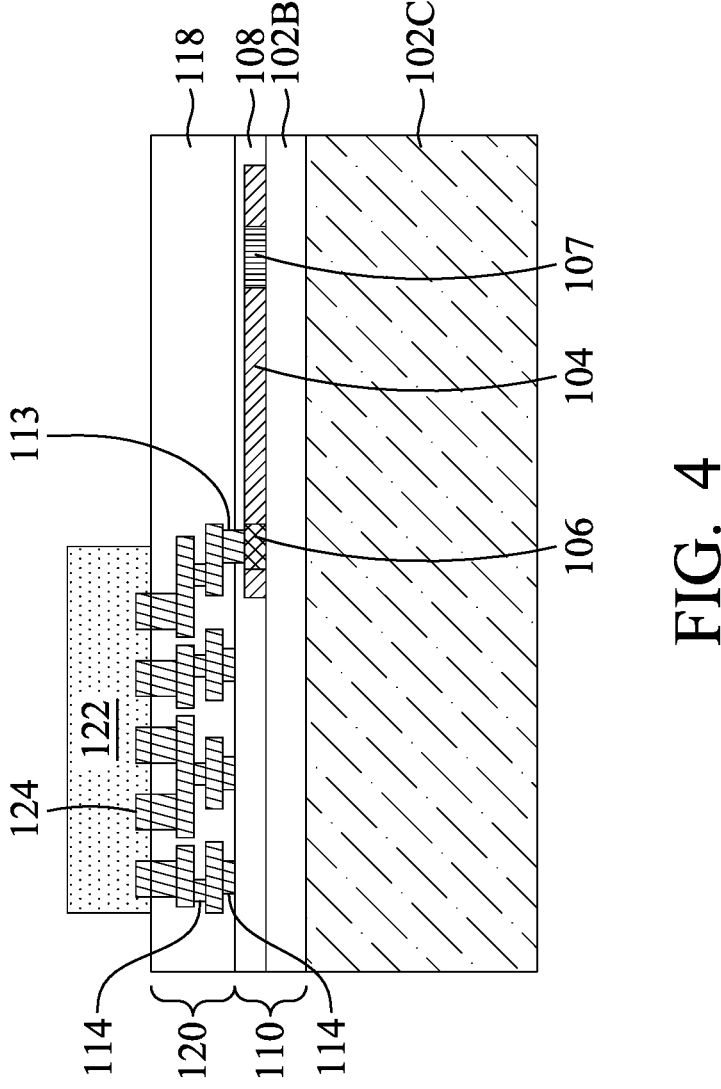

In FIG. 4, electronic dies 122 (only one electronic die 122 is shown) are bonded to the redistribution structure 120, in accordance with some embodiments. Each electronic die 122 may be, for example, a semiconductor device, die, or chip that may communicate with the photonic components 106 using electrical signals. In some embodiments, the electronic die 122 may process electrical signals received from photonic components 106 or may generate electrical signals that photonic components 106 convert into optical signals. The electronic die 122 includes die connectors 124, which may be, for example, conductive pads, conductive pillars, or the like. The electronic die 122 is bonded to the top-most conductive features 114 (e.g., bonding pads) of the redistribution structure 120 via the die connectors 124.

The electronic die 122 may include integrated circuits (not individually shown) for controlling the operation of the photonic components 106. For example, the electronic die 122 may include controllers, drivers, the like, or combinations thereof. The electronic die 122 may include a central processing unit (CPU) or memory functionality, in some embodiments. In some embodiments, the electronic die 122 includes integrated circuits for processing electrical signals received from photonic components 106 (e.g., photodetectors). The electronic die 122 may control high-frequency signaling of the photonic components 106 according to electrical signals received from another device or die, in some embodiments. In some embodiments, the electronic die 122 may be an electronic integrated circuit (EIC) or the like that provides Serializer/Deserializer (SerDes) functionality. In this manner, the electronic die 122 may act as part of an I/O interface between optical signals and electrical signals within a photonic package 10. In some cases, the photonic packages 10 described herein can be considered system-on-chip (SoC) or system-on-integrated-circuit (SoIC) devices. The electronic dies 122 can be obtained, for example, by sawing or dicing a semiconductor wafer (with several integrated circuit dies formed thereon) along scribed lines to separate the semiconductor wafer into a plurality of individual semiconductor dies. Details of electronic dies 122 will not be described further here.

In some embodiments, the electronic die 122 is bonded to the redistribution structure 120 using dielectric-to-dielectric bonding and/or metal-to-metal bonding. In such embodiments, dielectric-to-dielectric bonding may occur between the top-most dielectric layer 118 and a bonding layer (not individually shown) of the electronic die 122. During the bonding, metal-to-metal bonding may also occur between the die connectors 124 of the electronic die 122 and the top-most conductive features 114 of the redistribution structure 120.

In some embodiments, before performing the bonding process, a surface treatment is performed on the redistribution structure 120 and/or the electronic die 122. In some embodiments, the bonding surfaces of the redistribution structure 120 and/or the electronic die 122 may first be activated utilizing, for example, a dry treatment, a wet treatment, a plasma treatment, exposure to an inert gas, exposure to $H_2$, exposure to $N_2$, exposure to $O_2$, the like, or a combination thereof. However, any suitable activation process may be utilized. After the activation process, the redistribution structure 120 and/or the electronic die 122 may be cleaned using, e.g., a chemical rinse. The electronic die 122 is then aligned with the redistribution structure 120 and placed into physical contact with the redistribution structure 120 using, for example, a pick-and-place process. The redistribution structure 120 and the electronic die 122 may then be subjected to a thermal treatment and/or pressed against each other (e.g., by applying contact pressure) to bond the redistribution structure 120 and the electronic die 122. For example, the redistribution structure 120 and the electronic die 122 may be subjected to a pressure of about 200 kPa or less, and to a temperature in the range of about 200° C. to about 400° C. The redistribution structure 120 and the electronic die 122 may then be subjected to a temperature at or above the eutectic point of the material of the top-most conductive features 114 and the die connectors 124 (e.g., a temperature in the range of about 150° C. to about 650° C.) to fuse the top-most conductive features 114 and the die connectors 124. In this manner, the dielectric-to-dielectric bonding and/or metal-to-metal bonding of the redistribution structure 120 and the electronic die 122 forms a bonded structure. In some embodiments, the bonded structure is baked, annealed, pressed, or otherwise treated to strengthen or finalize the bonds.

Figure 5:
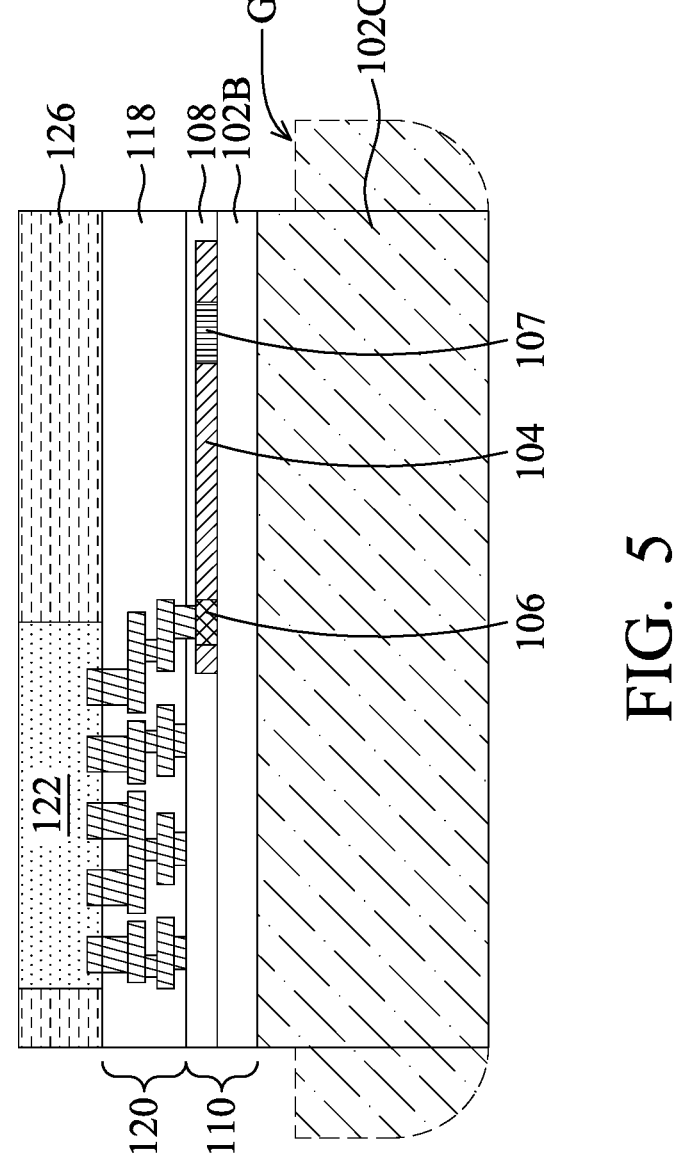

In FIG. 5, a dielectric material 126 is formed over the electronic die(s) 122 and the redistribution structure 120, in accordance with some embodiments. The dielectric material 126 may be formed of silicon oxide, silicon nitride, a polymer, the like, or a combination thereof, and may be formed by CVD, PVD, ALD, a spin process, the like, or a combination thereof. In some embodiments, the dielectric material 126 is a gap-fill material, which may include one or more of the example materials above. In some embodiments, the dielectric material 126 may be a material (e.g., silicon oxide) that is substantially transparent to light at wavelengths suitable for transmitting optical signals or optical power between the grating coupler 107 and a vertically-mounted optical fiber (e.g., the optical fiber 316 shown in FIG. 16). The dielectric material 126 may be a material similar to that of the dielectric layers 118 and/or the dielectric layer 108, in some embodiments. Other dielectric materials formed by any acceptable processes may be used. The dielectric material 126 may then be planarized using a planarization process such as a CMP process, a grinding process, or the like. In some embodiments, the planarization process may expose the electronic die 122 so that the surfaces of the electronic die 122 and the dielectric material 126 are coplanar.

It should be understood that the resulting structure shown in FIG. 5 is in the form of a wafer (i.e., not yet singulated), it is therefore also referred to hereinafter as a first (semiconductor) wafer 100 for purpose of illustration, which includes a plurality of electronic dies and photonic dies therein (only one electronic die 122 and one corresponding photonic die (i.e., the structure below the electronic die 122) are shown). The features described above may be parts of the same device dies among a plurality of device dies (including a plurality of photonic dies and electronic dies 122 bonded thereto) of the first wafer 100.

Other features and processes may also be included. For example, testing structures may be included to aid in the verification testing of the 3D packaging or 3DIC devices. The testing structures may include, for example, test pads formed in a redistribution layer or on a substrate that allows the testing of the 3D packaging or 3DIC, the use of probes and/or probe cards, and the like. The verification testing may be performed on intermediate structures as well as the final structure. Additionally, the structures and methods disclosed herein may be used in conjunction with testing methodologies that incorporate intermediate verification of known good dies to increase the yield and decrease costs.

In some embodiments, at the stage shown in FIG. 5 (i.e., before bonding to another wafer), an edge trimming process (not shown separately) is performed to trim the edge portion of the substrate (i.e., wafer) 102C of the resulting structure shown in FIG. 5, to form a groove G, which is a groove ring. In some embodiments, the edge trimming process may be performed after the first wafer 100 is bonded to another wafer (e.g., the second wafer 200 shown in FIG. 12). The edge trimming process is performed through an etching process, which may be a plasma etching process. Other suitable edge trimming processes may be used in different embodiments, such as a mechanical trimming process. The function of the groove G will be explained later.

Figure 6:
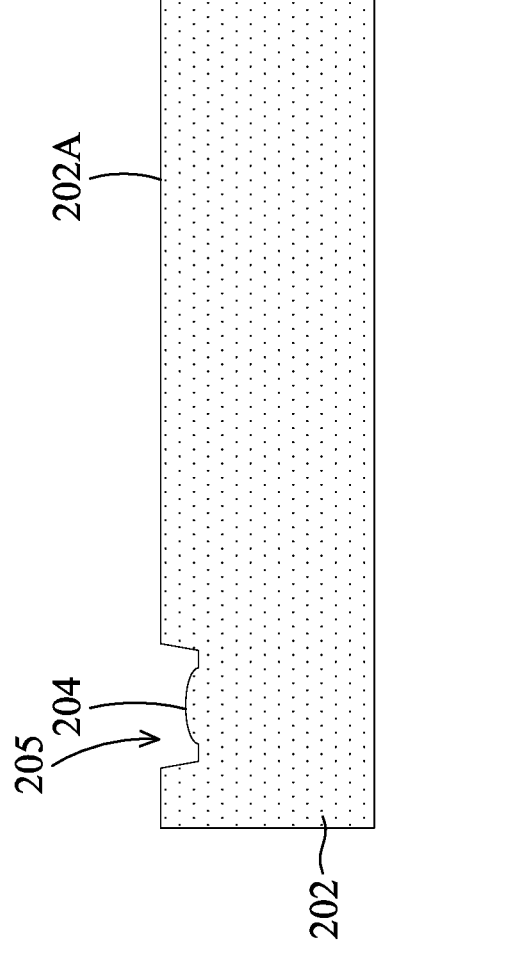

Next, referring to FIG. 6, a substrate 202 to be bonded to the first wafer 100 shown in FIG. 5 is provided, in accordance with some embodiments. The substrate 202 may be a rigid structure that can provide structural or mechanical stability. The use of a substrate 202 can reduce warping or bending of the first wafer 100, thereby improving the performance of the optical structures such as the waveguides 104 or photonic components 106. In some embodiments, the substrate 202 is formed of a material (e.g., silicon) transparent to relevant wavelengths of light so that optical signals may be transmitted through the substrate 202. In the embodiment shown in FIG. 6, the substrate 202 is a wafer, such as a silicon wafer. Other suitable materials (e.g., silicon oxide, metals, organic core materials, or the like) may be used for the substrate 202 in other embodiments.

FIG. 6 also illustrates the formation of micro lenses 204 (for simplicity, only one micro lens 204 is shown) within the substrate 202 (also referred to as the lens substrate 202), in accordance with some embodiments. The micro lens 204 can facilitate improved optical coupling between a grating coupler 107 (see FIG. 2) and a vertically-mounted optical fiber (e.g., the optical fiber 316 shown in FIG. 16) in the photonic package 10. In some embodiments, the micro lenses 204 are formed on (e.g., recessed from) the top surface 202A of the substrate 202, and a concave area 205 is formed between the surface of each micro lens 204 and the top surface 202A of the substrate 202. The micro lenses 204 may be formed using acceptable photolithography and etching techniques. For example, a hard mask layer (e.g., a nitride layer or the like, not shown) may be formed over the top surface 202A of the substrate 202 and patterned, with the pattern of the hard mask layer corresponding to the micro lenses 204, in some embodiments. An etching process may then be performed on the substrate 202 using the patterned hard mask layer as an etching mask to form the micro lenses 204. The etching processes may be a dry etching process or a wet etching process, which may include an isotropic process. In some embodiments, more than one photolithography and etching process may be used in order to form the micro lenses 204. After the formation of the micro lenses 204, the hard mask layer may be removed from the substrate 202 using an ashing process or other acceptable etching processes, in some embodiments. Alternatively, the hard mask layer still remains after forming the micro lenses 204.

Figure 7:
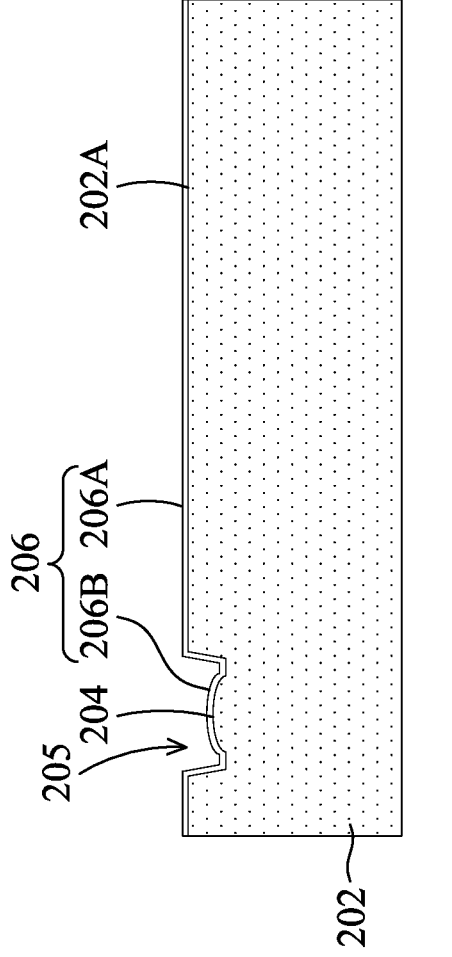

In FIG. 7, an anti-reflection coating (ARC) 206 is conformally formed over the top surface 202A of the substrate 202 including recessed micro lenses 204, in accordance with some embodiments. The anti-reflection coating 206 may include a first portion 206A formed on the top surface 202A of the substrate 202, and a second portion 206B formed on the surfaces of the micro lenses 204 and the sidewalls of the concave areas 205. The presence of the anti-reflection coating 206 is to reduce light reflections (i.e., reduce light loss) that occur on these surfaces, thereby improving the optical coupling efficiency within the photonic package 10. Although shown as a single layer, the anti-reflection coating 206 is a multi-layered structure in some embodiments. The anti-reflection coating 206 may include multiple layers (e.g., two, three or more layers) made of silicon oxide, silicon nitride, silicon oxynitride, the like, or a combination thereof.

These layers may each be formed to have a suitable thickness by any acceptable process, such as CVD, PVD, ALD, or other acceptable deposition processes. In some cases, the anti-reflection coating 206 may also act as a stop layer for a subsequent planarization process (see FIG. 10). The anti-reflection coating 206 may be omitted in other embodiments.

Figure 8:
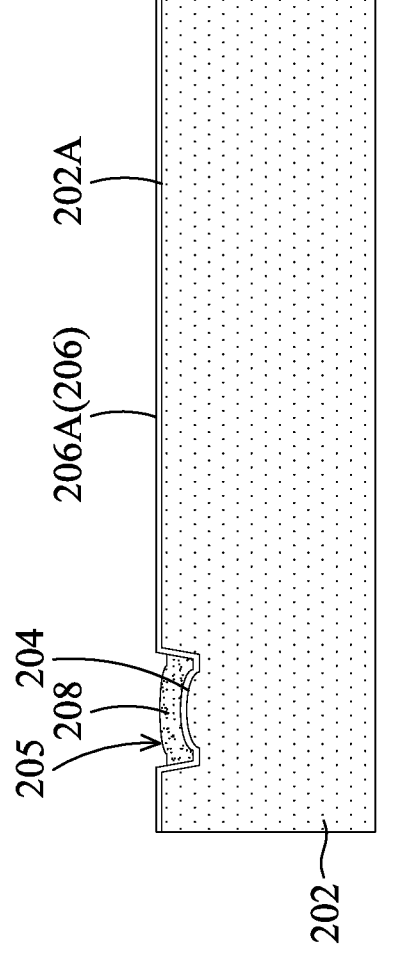

In FIG. 8, after forming the anti-reflection coating 206, a dielectric material 208 is deposited in the concave area 205 (of each micro lens 204), in accordance with some embodiments. In some embodiments, the dielectric material 208 (also referred to as gap-fill material) is formed to fill a portion of the concave area 205 (for example, 70% or more of the volume of the concave area 205, but the disclosure is not limited thereto) without extending over the top surface 202A of the substrate 202. In some embodiments, the dielectric material 208 is a silicon-oxygen-carbon based compound, and is deposited using a spin coating process. For example, the dielectric material 208 may comprise silicon (Si), oxygen (O), carbon (C), any other suitable element, or a combination thereof. In some embodiments, a silicon concentration of the dielectric material 208 is from about 5 weight percent (wt %) to about 30 weight percent, an oxygen concentration of the dielectric material 208 is from about 5 weight percent to about 60 weight percent, and/or a carbon concentration of the dielectric material 208 is from about 5 weight percent to about 90 weight percent. In some embodiments, the dielectric material 208 is consist of silicon, oxygen, and carbon, and therefore the overall concentration of silicon, oxygen, and carbon in the dielectric material 208 is substantially 100%. In some embodiments, the dielectric material 208 may be a material (e.g., carbon-doped silicon oxide) that is substantially transparent to light at wavelengths suitable for transmitting optical signals or optical power between the grating coupler 107 and a vertically-mounted optical fiber.

During the spin coating process, the dielectric material 208 is applied in a liquid state over the top surface 202A of the substrate 202 and in the concave area 205. A spin coater (not shown) holding the substrate 202 can then be rotated at a suitable speed until the desired thickness of the dielectric material 208 is reached. In the embodiments shown in FIG. 8, the spin coater can rotate at a relatively high speed, so that all the dielectric material 208 on the top surface 202A of the substrate 202 is thrown off, leaving only part of the dielectric material 208 in the concave area 205. Due to the liquidity of the spin coating process, the dielectric material 208 can fill the concave area 205 well, thereby reducing the formation of voids or cracks at the interface between the substrate 202 and the dielectric material 208 during subsequent thermal processing. After the dielectric material 208 reaches the desired thickness (as mentioned above), a curing process (e.g., a thermal curing process) is performed to cure the dielectric material 208 in some embodiments. For illustration, the dielectric material 208 is hereinafter also referred to as the first dielectric material 208.

Figure 9:
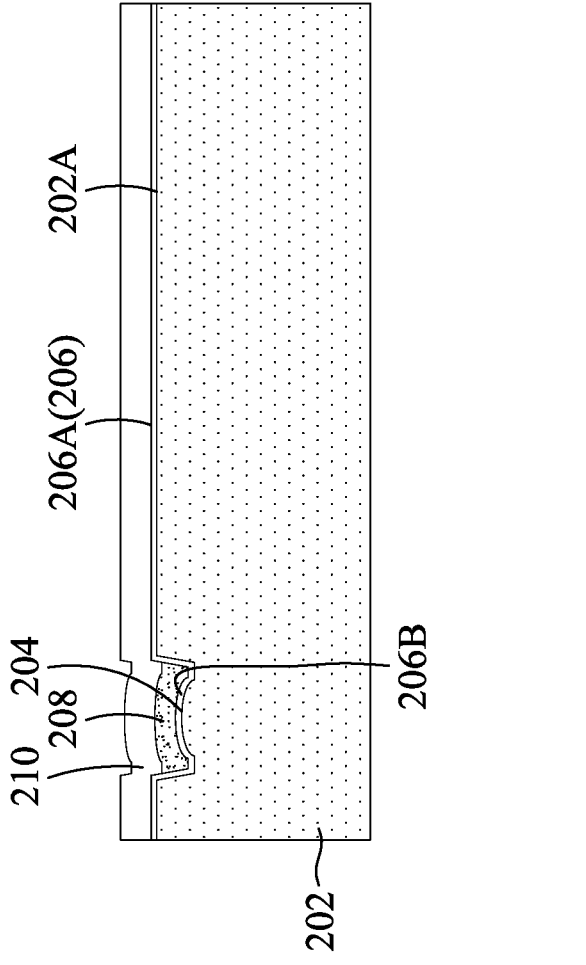

In FIG. 9, a second dielectric material 210 is conformally deposited over the top surface 202A of the substrate 202 and over the first dielectric material 208 in the concave area 205, in accordance with some embodiments. In some embodiments, the second dielectric material 210 (also referred to as gap-fill material) is formed to fill the remainder of the concave area 205 and cover the top surface 202A of the substrate 202. In some embodiments, the second dielectric material 210 comprises silicon and oxygen, and is deposited using a CVD process. In some embodiments, the second dielectric material 210 may also be a material (e.g., silicon oxide) that is substantially transparent to light at wavelengths suitable for transmitting optical signals or optical power between the grating coupler 107 and a vertically-mounted optical fiber.

Due to the isotropic deposition nature of the CVD process, the second dielectric material 210 is formed to have a surface topography that matches that of the underlying structure. In this regard, since the concave area 205 in the top surface 202A of the substrate 202 has been partially filled with the first dielectric material 208 in the previous step, the surface topography (i.e., the surface height difference) of the top surface 202A is reduced as shown in FIG. 9. Accordingly, the surface topography of the overlying second dielectric material 210 is correspondingly reduced compared to the case where the concave area 205 is not filled with the first dielectric material 208. This helps to improve the performance of the subsequent planarization process.

Figure 10:
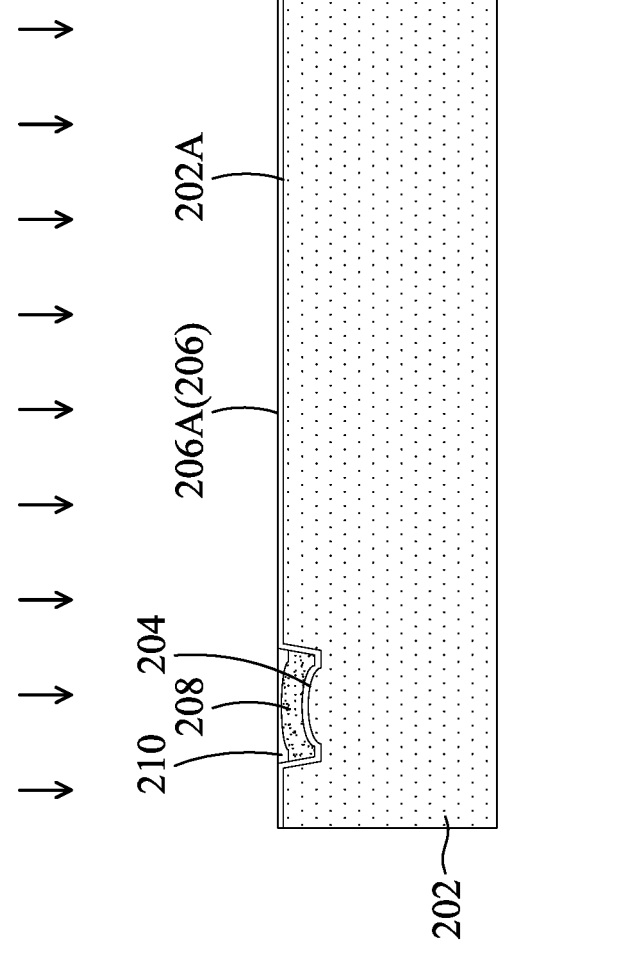
Figures 1, 10:
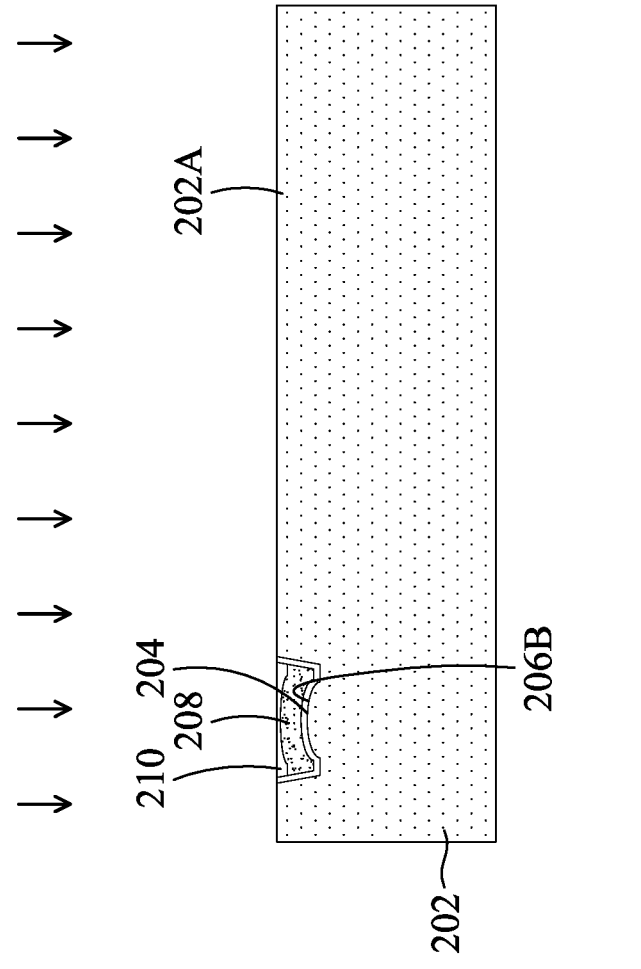

In FIG. 10, the second dielectric material 210 is planarized (or thinned) using a planarization process (as indicated by the solid arrows in FIG. 10) such as a CMP process, a grinding process, or the like, in accordance with some embodiments. In some embodiments, the planarization process may expose the first portion 206A of the anti-reflection coating 206 over the top surface 202A of the substrate 202 so that the top surfaces of the first portion 206A of the anti-reflection coating 206 and the remaining second dielectric material 210 are substantially level or coplanar. In such cases, the anti-reflection coating 206 may act as a stop layer for the planarization process. In some embodiments, after the planarization process, a thin film of the second dielectric material 210 remains on the top surface 202A of the substrate 202, which facilitates the formation of a bonding layer 212 (see FIG. 11) over top surface 202A in a subsequent process. In the example of FIG. 10, the concave area 205 (of the micro lens 204) is filled with two dielectric materials (i.e., the dielectric materials 208 and 210) after the planarization process.

As described above, since the second dielectric material 210 has a reduced surface topography (compared to the case where only a single oxide material is deposited in the concave area 205 using a CVD process), it can be planarized more easily and quickly. Accordingly, the performance of the planarization process is improved (e.g., process time and cost are reduced).

In some embodiments shown in FIG. 10-1, after the second dielectric material 210 covering the first portion 206A of the anti-reflection coating 206 is planarized (i.e., removed), optionally, the first portion 206A of the anti-reflection coating 206 is further planarized (or thinned) using a planarization process (as indicated by the solid arrows in FIG. 10-1) such as a CMP process, a grinding process, or the like. The planarization process may expose the top surface 202A of the substrate 202 so that the top surface of the remaining second dielectric material 210 is flush with the top surface 202A of the substrate 202. In some embodiments, the planarization process for the first portion 206A of the anti-reflection coating 206 may be omitted, as in the embodiment shown in FIG. 10. For simplicity, the processes described below with reference to FIGS. 11 to 16 are performed following up the example of FIG. 10 in some embodiments. However, those processes may also be performed following up the example of FIG. 10-1 in other embodiments.

Figure 11:
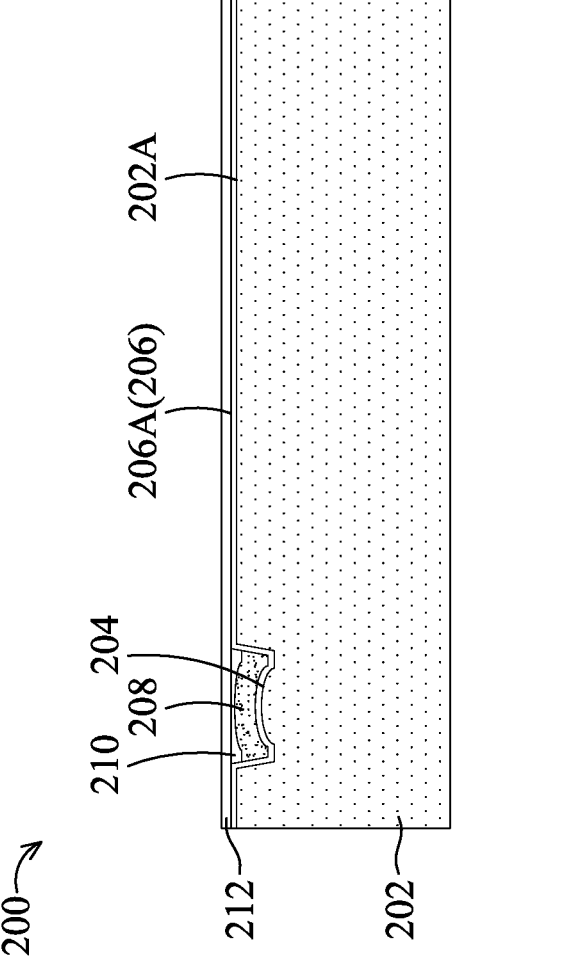

In FIG. 11, a bonding layer 212 is deposited on the planarized second dielectric material 210 and over the top surface 202A of the substrate 202 (and on the first portion 206A of the anti-reflection coating 206, if present), in accordance with some embodiments. The bonding layer 212 may be formed of or comprise, for example, a silicon-based dielectric material, such as silicon oxide ($SiO_2$), SiN, SiON, SiOCN, SiC, SiCN, the like, or a combination thereof, and may be formed using high-density plasma chemical vapor deposition (HDPCVD), plasma enhanced chemical vapor deposition (PECVD), CVD, low-pressure chemical vapor deposition (LPCVD), ALD, or the like.

It should be understood that the resulting structure shown in FIG. 11 is in the form of a wafer (i.e., not yet singulated), it is therefore also referred to hereinafter as a second (semiconductor) wafer 200 for purpose of illustration, which includes a plurality of dies therein (only one die is shown that includes one or more micro lenses 204 embedded in the substrate 202). The features described above may be parts of the same dies among a plurality of dies of the second wafer 200. The second wafer 200 may have lateral dimensions (e.g., length, width, and/or area) that are greater than, about the same as, or smaller than those of the first wafer 100 shown in FIG. 5.

Figure 12:
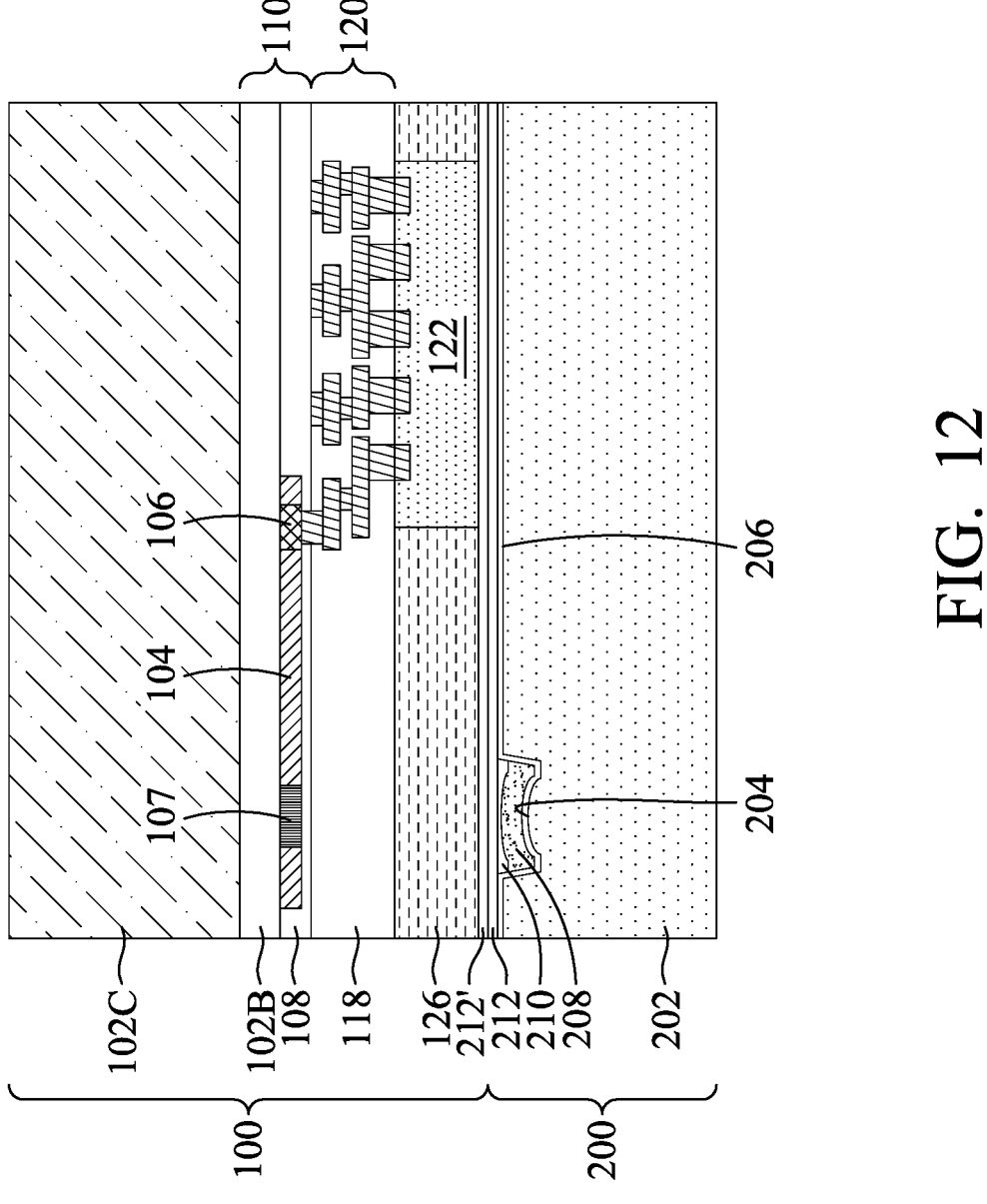

In FIG. 12, the first wafer 100 shown in FIG. 5 is flipped over and bonded to the second wafer 200 using a "wafer-on-wafer (WoW)" bonding process, in accordance with some embodiments. In some embodiments, the first wafer 100 is bonded to the bonding layer 212 of the second wafer 200 using the bonding layer 212. In some embodiments, a bonding layer 212' (similar to the bonding layer 212) may also be formed over the exposed surfaces (e.g., the upper surfaces shown in FIG. 5) of the electronic die 122 and the dielectric material 126 before the bonding process. Dielectric-to-dielectric bonding may occur between the bonding layer 212 of the second wafer 200 and the bonding layer 212' of the first wafer 100.

In some embodiments, before performing the WoW bonding process, a surface treatment is performed on the first wafer 100 and/or the second wafer 200. In some embodiments, the bonding surfaces of the first wafer 100 and/or the second wafer 200 may first be activated utilizing, for example, a dry treatment, a wet treatment, a plasma treatment, exposure to an inert gas, exposure to $H_2$, exposure to $N_2$, exposure to $O_2$, the like, or a combination thereof. However, any suitable activation process may be utilized. After the activation process, the first wafer 100 and/or the second wafer 200 may be cleaned using, e.g., a chemical rinse. The first wafer 100 is then aligned with the second wafer 200 (e.g., the device dies of the first wafer 100 are aligned with the dies of the second wafer, and the grating couplers 107 are aligned with the micro lenses 204) and placed into physical contact with the second wafer 200. The first wafer 100 may be placed on the second wafer 200 using, for example, a pick-and-place process. The first wafer 100 and the second wafer 200 may then be pressed against each other (e.g., by applying contact pressure) to bond the first wafer 100 and the second wafer 200. For example, the first wafer 100 and the second wafer 200 may be subjected to a pressure of about 200 kPa or less at about room temperature. In this manner, the dielectric-to-dielectric bonding of the first wafer 100 and the second wafer 200 forms a bonded structure. Other suitable WoW bonding processes may also be used in other embodiments.

Figure 13:
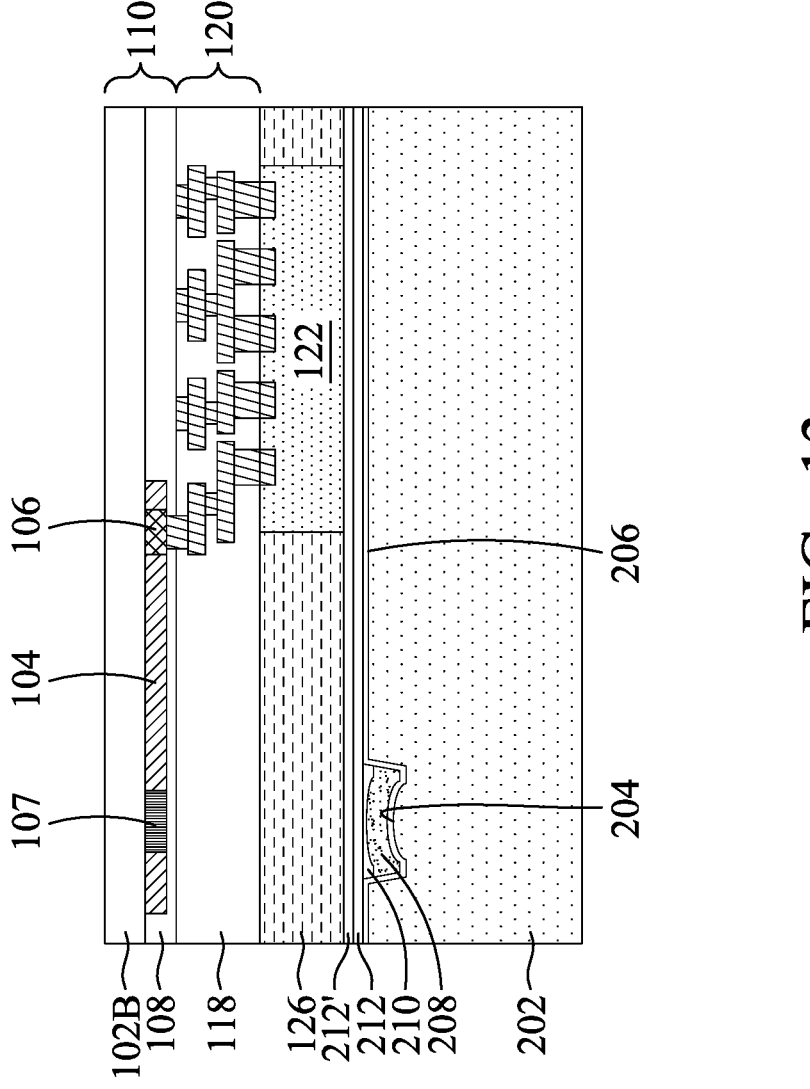

In FIG. 13, the substrate 102C of the first wafer 100 is thinned using a removal process, in accordance with some embodiments. In some cases, thinning the substrate 102C may improve optical coupling between a waveguide 104 and additional nitride waveguides 314 (see FIG. 14). The removal process may include a planarization process (e.g., a CMP or grinding process), an etching process, the like, or a combination thereof. The substrate 102C may be completely removed from the underlying structure, or a portion of the substrate 102C still remains after the removal process, in some embodiments. In some embodiments, by providing the groove G (see FIG. 5) at the edge portion of the substrate/ wafer 102C (due to the edge trimming process), stress problems that may occur during substrate removal can be reduced or avoided.

In some embodiments, one or more reflectors (not shown) may be formed in the thinned substrate 102C and adjacent to the grating couplers 107 in order to reflect light from one or more vertically-mounted optical fibers 316 (e.g., see FIG. 16) into the grating couplers 107. These and other photonic structures are considered within the scope of the present disclosure.

In FIG. 14, a photonic routing structure 310 is formed over the oxide layer 102B (or the thinned substrate 102C, if present), in accordance with some embodiments. The photonic routing structure 310 includes one or more dielectric layers (collectively referred to as "dielectric layers 312") and includes silicon nitride waveguides 314 formed in the dielectric layers 312. The silicon nitride waveguides 314 provide additional optical signal routing and may be optically coupled to the waveguide 104, in some embodiments. In some cases, a waveguide formed from silicon nitride (e.g., nitride waveguides 314) may have advantages over a waveguide formed from silicon (e.g., waveguides 104). For example, silicon nitride has a higher dielectric constant than silicon, and thus a nitride waveguide may have a greater internal confinement of light than a silicon waveguide. This may also allow the performance or leakage of nitride waveguides to be less sensitive to process variations, less sensitive to dimensional uniformity, and less sensitive to surface roughness (e.g., edge roughness or linewidth roughness). The formation method of the silicon nitride waveguides 314 may be similar to that described above for forming the silicon waveguides 104.

Figure 15:
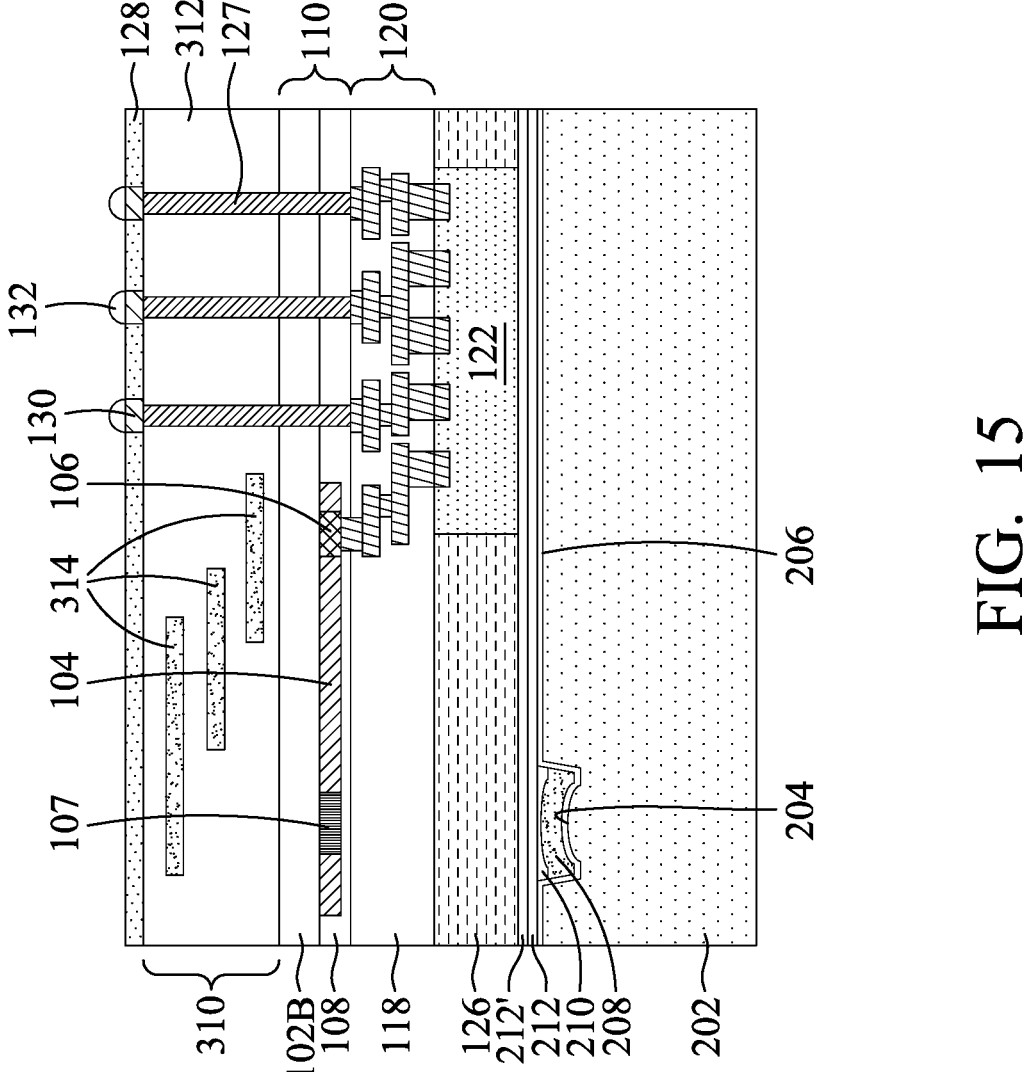

In FIG. 15, vias 127 are formed extending through the dielectric layers 312, the thinned substrate 102C (if present), the oxide layer 102B, and the dielectric layer 108 to physically and electrically contact the conductive features 114 of the redistribution structure 120, in accordance with some embodiments. The vias 127 may be formed using techniques and materials similar to those described above for forming the conductive features 114.

Still referring to FIG. 15, conductive connectors 132 are then formed over the vias 127, in accordance with some embodiments. The conductive connectors 132 may be used to electrically connect the photonic package 10 to an external structure such as a package substrate, an interposer, or the like. In some embodiments, an optional passivation layer 128 is formed over the dielectric layers 312. The passivation layer 128 may comprise, for example, a polymer such as polybenzoxazole (PBO), polyimide, benzocyclobutene (BCB), or the like, and may be formed by spin coating, lamination, CVD, PVD, ALD, or the like. In some embodiments, under-bump metallizations (UBMs) 130 may be formed within the passivation layer 128 to make physical and electrical contact to the vias 127. The UBMs 130 may be formed of one or more suitable conductive materials using a suitable process, such as plating. The conductive connectors 132 are then formed on the UBMs 130 using a suitable process, such as plating, printing, solder transfer, ball placement, or the like, in accordance with some embodiments. The conductive connectors 132 may be, for example, ball grid array (BGA) connectors, solder balls, metal pillars, controlled collapse chip connection (C4) bumps, micro bumps, electroless nickel-electroless palladium-immersion gold technique (ENEPIG) formed bumps, or the like. The conductive connectors 132 may include a conductive material such as solder, copper, aluminum, gold, nickel, silver, palladium, tin, the like, or a combination thereof.

Figure 16:
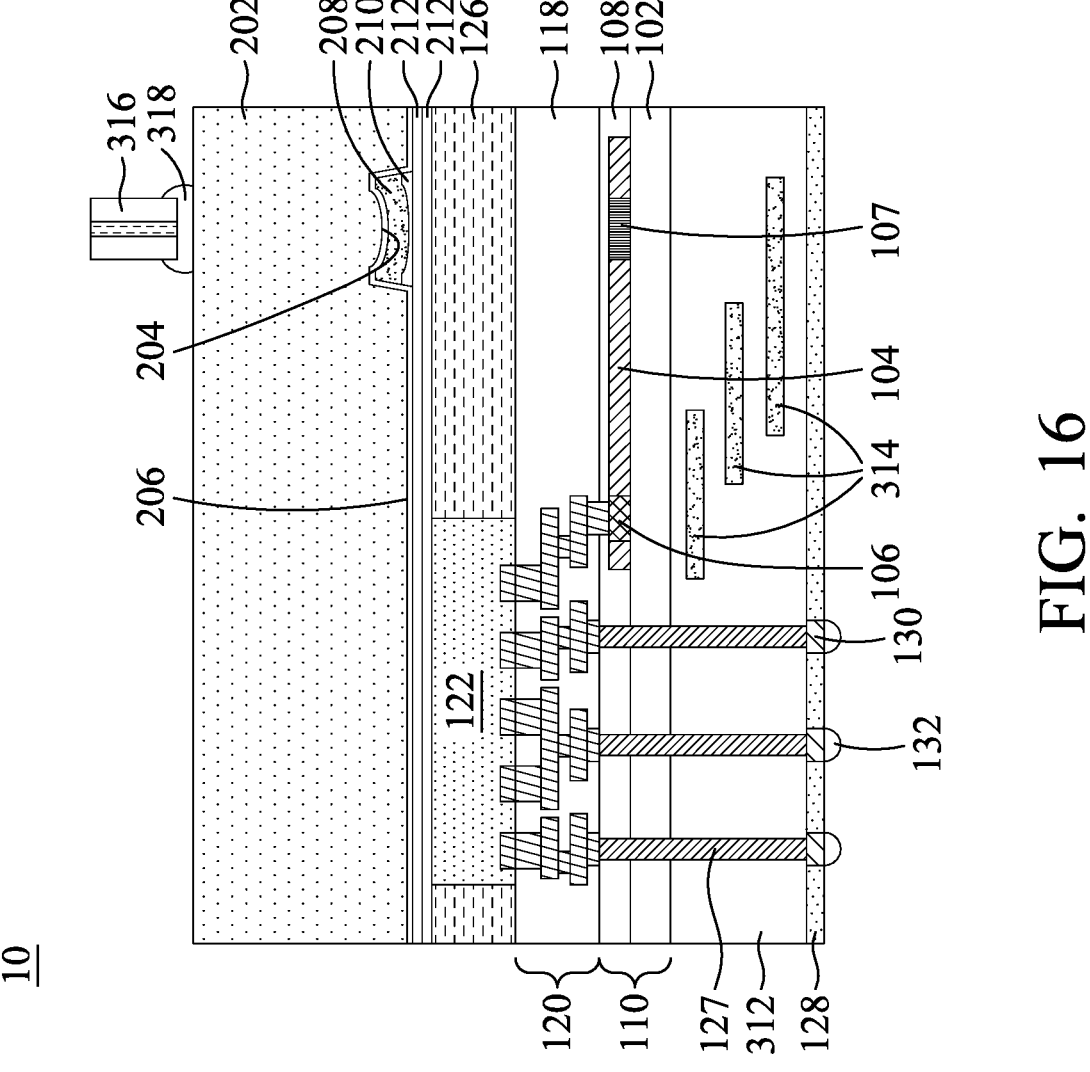

In FIG. 16, the resulting package structure shown in FIG. 15 is flipped over and attached to a temporary carrier (e.g., a glass carrier, a ceramic carrier, or the like, not shown), in accordance with some embodiments. In some embodiments, a singulation process is then performed by, for example, sawing along scribed lines (not shown) of the package structure to separate the multiple photonic packages within the package structure into individual photonic packages 10, such as the individual photonic package 10 shown in FIG. 16. A de-bonding process may then be performed to de-bond or remove the carrier from the photonic packages 10 after the singulation process. The carrier may be removed by any acceptable process, such as an etching process, a CMP process, a grinding process, the like, or other acceptable removal processes.

Still referring to FIG. 16, the photonic package 10 is shown as coupled to a vertically-mounted optical fiber 316, in accordance with some embodiments. In other embodiments, another number of vertically-mounted optical fibers 316 are coupled to the photonic package 10. The optical fibers 316 may be mounted to the photonic package 10 (e.g., the outer surface of the substrate 202) using an optical glue 318 or the like. In some embodiments, the optical fibers 316 are optically coupled to the grating coupler 107 within the photonic package 10 (through the micro lenses 204) to support optical communication between the photonic package 10 and an external optical device or system. In the embodiment shown in FIG. 16, the optical signals and/or optical power are transmitted between the vertically-mounted optical fiber 316 and the grating coupler 107, and transmitted through the substrate 202 and any other intervening layers.

FIGS. 17 to 21 illustrate cross-sectional views of intermediate stages in the formation of a photonic package 20 (see FIG. 21), in accordance with some embodiments. The photonic package 20 is similar to the photonic package 10 described above, except that the first dielectric material 208 further extends over the top surface 202A of the substrate 202. In some cases, forming the first dielectric material 208 to cover the top surface 202A of the substrate 202 may allow the first dielectric material 208 to act as a stop layer for a subsequent planarization process (see FIG. 19) after curing. The photonic package 20 may be formed using similar materials or process steps as those described previously for the photonic package 10, so some details may not be repeated below.

Figure 17:
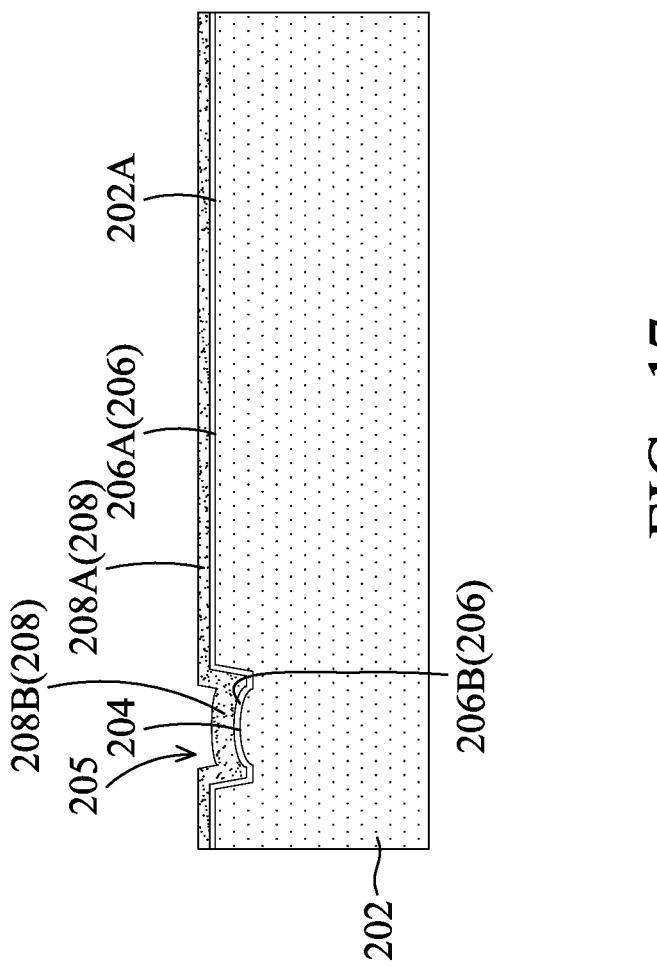
FIGS. 17 to 21 illustrate cross-sectional views of intermediate stages in the formation of a photonic package, in accordance with some embodiments.

FIG. 17 illustrates a structure similar to the structure shown in FIG. 8, except that the first dielectric material 208 further extends from the concave area 205 to cover the top surface 202A of the substrate 202. In the embodiment shown in FIG. 17, the first dielectric material 208 is formed to include a first portion 208A deposited over the top surface 202A of the substrate 202 (and the first portion 206A of the anti-reflection coating 206), and a second portion 208b that fills a portion of the concave area 205 (for example, 90% or more of the volume of the concave area 205, but the disclosure is not limited thereto) and is deposited over the second portion 206B of the anti-reflection coating 206. In some embodiments, the first dielectric material 208 is deposited using techniques (i.e., spin coating deposition) similar to those described previously for depositing the first dielectric material 208 shown in FIG. 8. By controlling the spin coater (not shown) to rotate at an appropriate speed, the deposited first dielectric material 208 can reach the desired thickness, wherein the first dielectric material 208 partially fills the concave area 205 and also covers the top surface 202A of the substrate 202.

Due to the liquidity of the spin coating process, the first dielectric material 208 can fill the concave area 205 well, thereby reducing the formation of voids or cracks at the interface between the substrate 202 and the first dielectric material 208 during subsequent thermal processing. Also, the first portion 208A of the first dielectric material 208 deposited using a spin coating deposition (i.e., a material-flowable process) may have a reduced thickness compared to the case where the first dielectric material 208 is isotropically deposited using a CVD process. This helps to improve the performance of a subsequent planarization process. In some embodiments, a curing process (e.g., a thermal curing process) is then performed to cure the first dielectric material 208. As mentioned above, the cured first dielectric material 208 may act as a stop layer for the subsequent planarization process.

Figure 18:
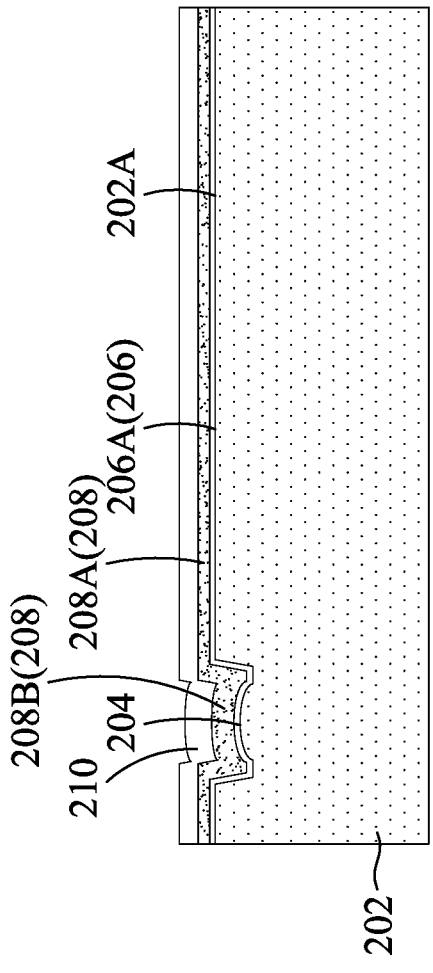

In FIG. 18, a second dielectric layer 210 (similar to the second dielectric layer 210 shown in FIG. 9) is conformally deposited over the first dielectric material 208 that is formed over the top surface 202A of the substrate 202 and in the concave area 205, in accordance with some embodiments. In some embodiments, the second dielectric material 210 is formed to fill the remainder of the concave area 205 and cover the first dielectric material 208 (i.e., first portion 208A) over the top surface 202A of the substrate 202. In some embodiments, the second dielectric material 210 may be deposited using techniques (i.e., CVD) similar to those described previously for depositing the second dielectric material 210 shown in FIG. 9.

Since the concave area 205 in the top surface 202A of the substrate 202 has been partially filled with the first dielectric material 208 (i.e., second portion 208B) in the previous step, and the thickness of the first portion 208A of the first dielectric material 208 over the top surface 202A is relatively small, the surface topography (i.e., the surface height difference) of the top surface 202A is reduced as shown in FIG. 18. Accordingly, the surface topography of the overlying second dielectric material 210 is correspondingly reduced compared to the case where the concave area 205 is not filled with the first dielectric material 208. This helps to improve the performance of the subsequent planarization process.

Figure 19:
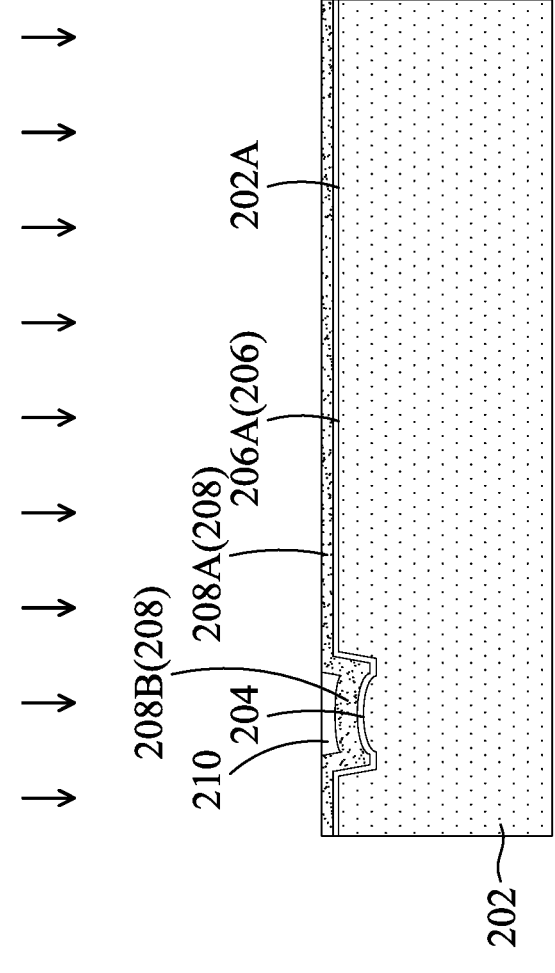

In FIG. 19, the second dielectric material 210 is planarized (or thinned) using a planarization process (as indicated by the solid arrows in FIG. 19) such as a CMP process, a grinding process, or the like, in accordance with some embodiments. In some embodiments, the planarization process may expose the first portion 208A of the first dielectric material 208 over the top surface 202A of the substrate 202 so that the top surfaces of the first portion 208A of the first dielectric material 208 and the remaining second dielectric material 210 are substantially level or coplanar. In such cases, the first dielectric material 208 may act as a stop layer for the planarization process. In the example of FIG. 19, the concave area 205 (of the micro lens 204) is filled with two dielectric materials (i.e., the dielectric materials 208 and 210) after the planarization process. Although not shown, the first dielectric material 208 may laterally surround the second dielectric material 210 within the concave area 205 when viewed from the top. Due to the reasons similar to those described previously for the example of FIG. 10, the performance of the planarization process is also improved (e.g., process time and cost are reduced) in the example of FIG. 19.

Figure 20:
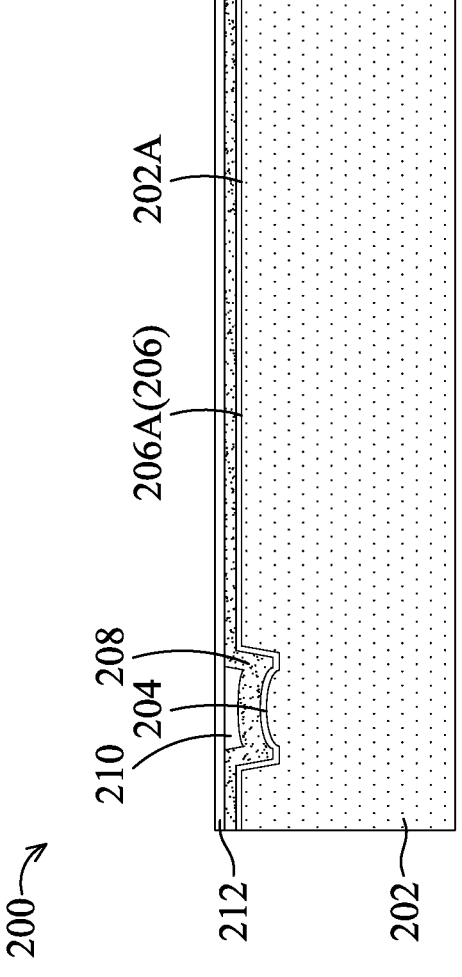
Figure 21:
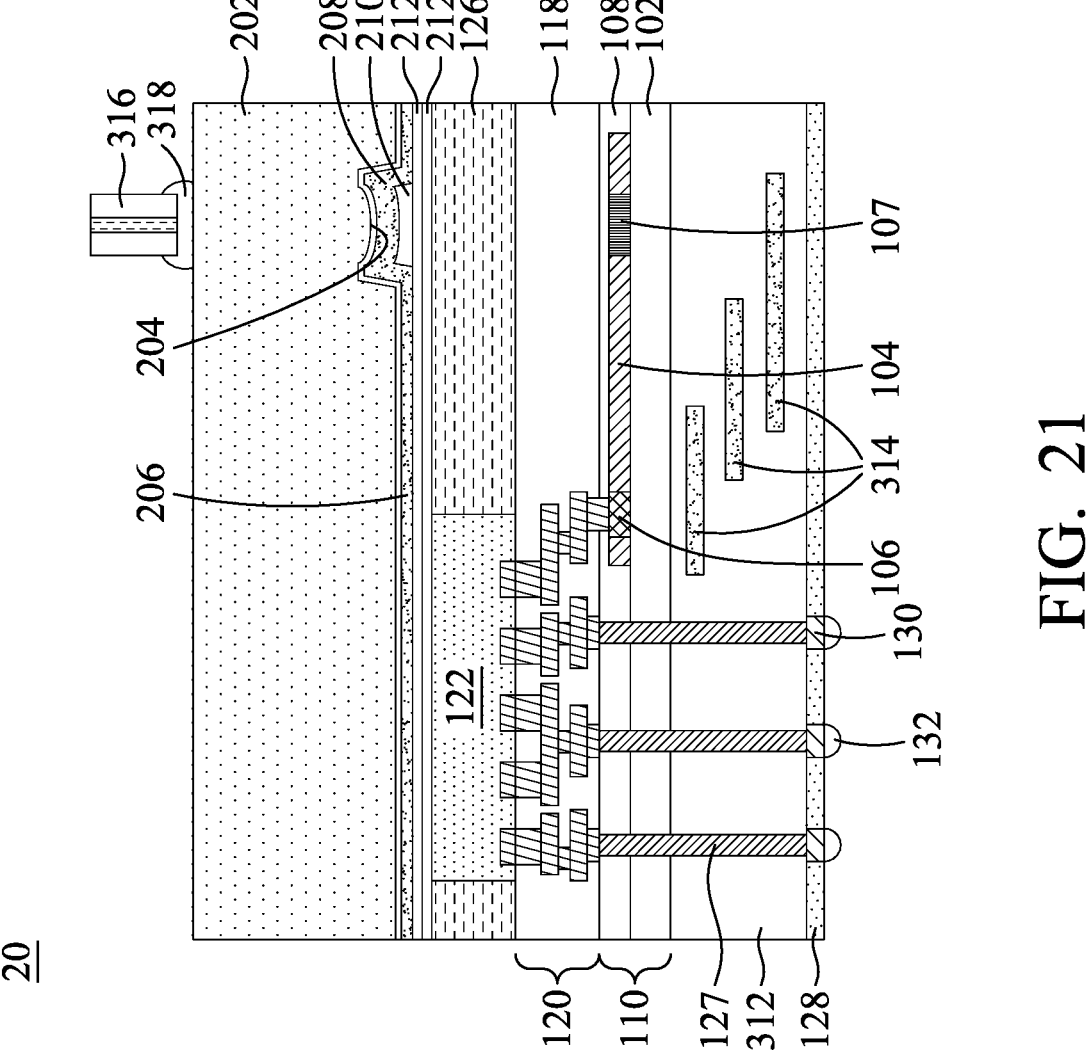

In FIG. 20, a bonding layer 212 (similar to the bonding layer 212 shown in FIG. 11) is deposited on (e.g., in direct contact with) the planarized second dielectric material 210 and the exposed first dielectric material 208, thereby forming a second wafer 200, in accordance with some embodiments. The formation method of the bonding layer 212 may be similar to that described above for forming the bonding layer 212 shown in FIG. 11. Afterwards, similar fabrication processes as shown in FIGS. 12 to 16 are performed on the second wafer 200 to complete the formation of the photonic package 20 shown in FIG. 21.

FIGS. 22 to 26 illustrate cross-sectional views of intermediate stages in the formation of a photonic package 30 (see FIG. 26), in accordance with some embodiments. The photonic package 30 is similar to the photonic package 10 described above, except that the concave area 205 (of the micro lens 204) is filled with only a single photosensitive dielectric material 230, wherein the photosensitive dielectric material 230 may be patterned by a photolithography process prior to the planarization process to define a planarization region (i.e., region that needed to be planarized). In some embodiments, filling the concave area 205 with only a single photosensitive dielectric material 230 can simplify the gap-filling process, and pre-defining the planarization region with photolithography process also helps to improve the performance of the planarization process. The photonic package 30 may be formed using similar materials or process steps as those described previously for the photonic package 10, so some details may not be repeated below.

Figure 22:
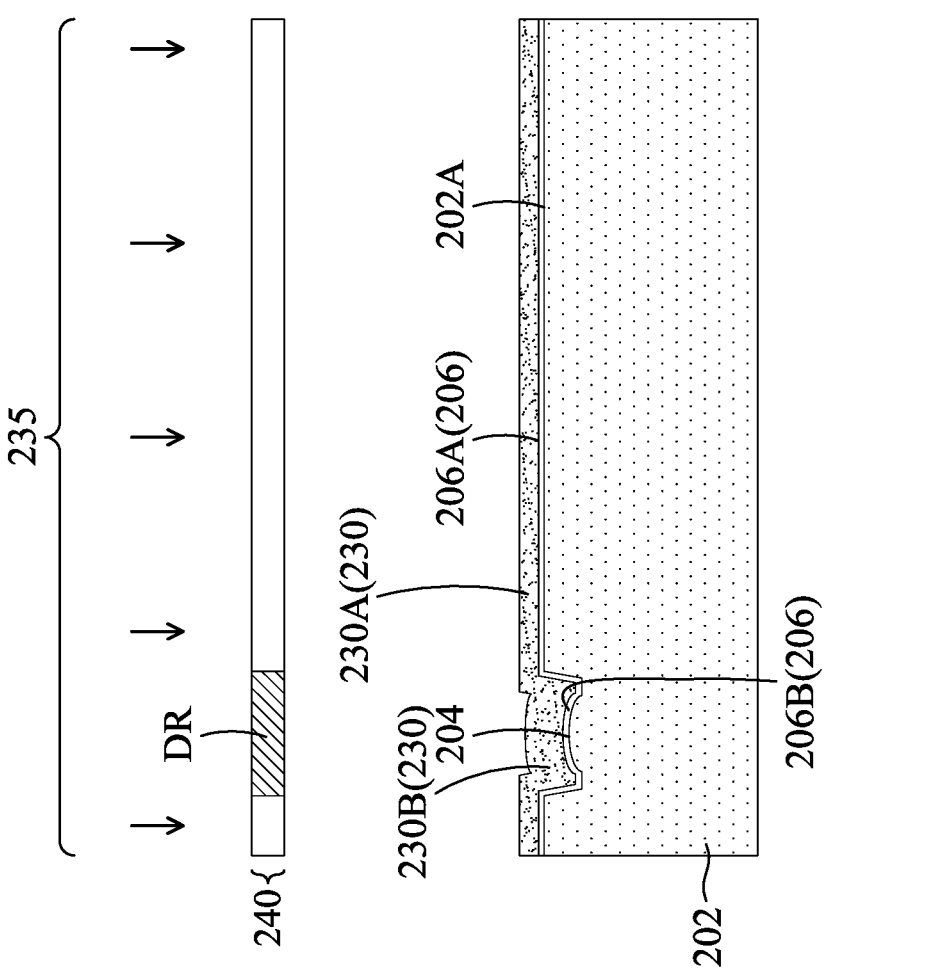
FIGS. 22 to 26 illustrate cross-sectional views of intermediate stages in the formation of a photonic package, in accordance with some embodiments.

In FIG. 22, a structure that is similar to the structure shown in FIG. 7 is provided or received, in accordance with some embodiments. Afterwards, a photosensitive dielectric material 230 is deposited over the top surface 202A of the substrate 202 including recessed micro lenses 204, in accordance with some embodiments. The photosensitive dielectric material 230 may be similar to the first dielectric material 208 described above (e.g., a silicon-oxygen-carbon based compound), except that the photosensitive dielectric material 230 further includes photosensitive additives (in order to enable photopatterning). In the embodiment shown in FIG. 22, the photosensitive dielectric material 230 is formed to include a first portion 230A deposited over the first portion 206A of the anti-reflection coating 206 over the top surface 202A of the substrate 202, and a second portion 230B that fills the entire concave area 205 and is deposited over the second portion 206B of the anti-reflection coating 206. The photosensitive dielectric material 230 is deposited using techniques (i.e., spin coating deposition) similar to those described previously for depositing the first dielectric material 208 shown in FIG. 8. By controlling the spin coater (not shown) to rotate at an appropriate speed, the deposited photosensitive dielectric material 230 can reach the desired thickness, wherein the photosensitive dielectric material 230 fills the entire concave area 205 and also covers the top surface 202A of the substrate 202.

Due to the liquidity of the spin coating process, the photosensitive dielectric material 230 can fill the concave area 205 well, thereby reducing the formation of voids or cracks at the interface between the substrate 202 and the photosensitive dielectric material 230 during subsequent thermal processing. Also, the portion of the photosensitive dielectric material 230 deposited over the top surface 202A of the substrate 200 using a spin coating deposition (i.e., a material-flowable process) may have a reduced thickness compared to the case where the photosensitive dielectric material 230 is isotropically deposited using a CVD process. This helps to improve the performance of a subsequent planarization process (see FIG. 24) due to reduced surface topography. In some embodiments, a curing process (e.g., a thermal curing process) is then performed to cure the photosensitive dielectric material 230.

Figure 23:
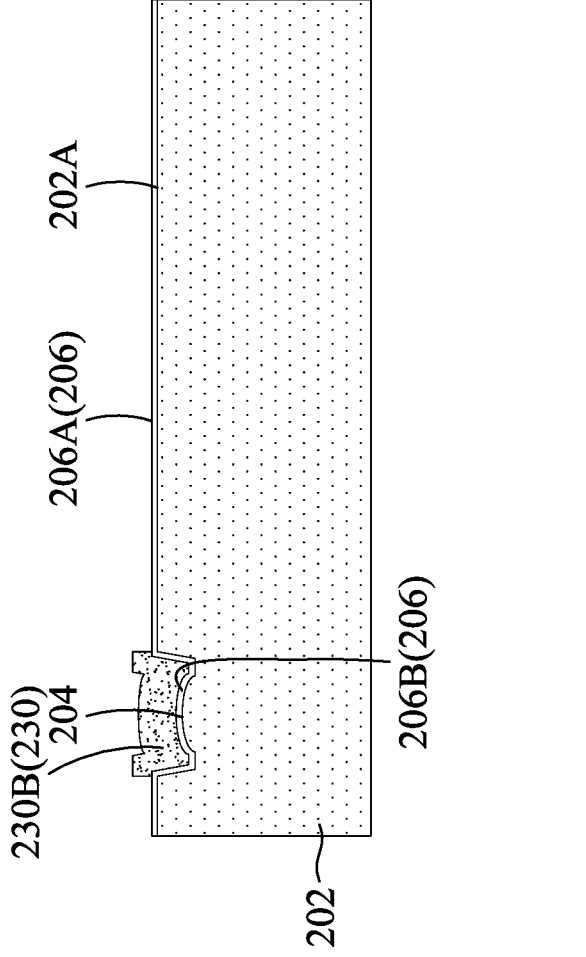

Still referring to FIG. 22, after depositing the photosensitive dielectric material 230, it is developed by a photopatterning process 235 where light is shown through a light mask 240, and then cured (e.g., thermally cured), in accordance with some embodiments. In the embodiment shown in FIG. 22, the photosensitive dielectric material 230 is a negative tone dielectric material so that everywhere that is exposed to light is removed during the developing process, and the light mask 240 may have an opaque area DR corresponding to the second portion 230B of the photosensitive dielectric material 230 over the micro lens 204. In this manner, the result from the photopatterning process 235 of FIG. 22 is shown in FIG. 23, wherein the photosensitive dielectric material 230 has been developed (e.g., the first portion 230A exposed to light has been removed) and cured, leave only the second portion 230B of the photosensitive dielectric material 230 in the concave area 205. In some alternative embodiments (not shown), the photosensitive dielectric material 230 may be a positive tone dielectric material so that everywhere that is not exposed to light is removed during the developing process, and the opaque area DR of the light mask 240 corresponds to the first portion 230A of the photosensitive dielectric material 230 over the top surface 202A. In this manner, the same result as shown in FIG. 23 can be achieved.

Figure 24:
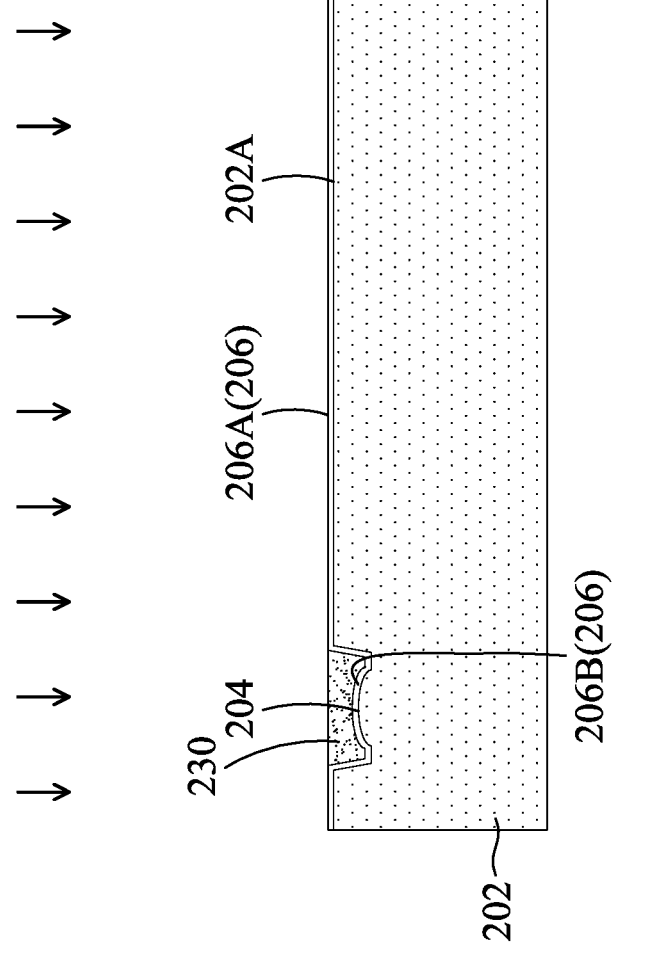
Figures 1, 24:
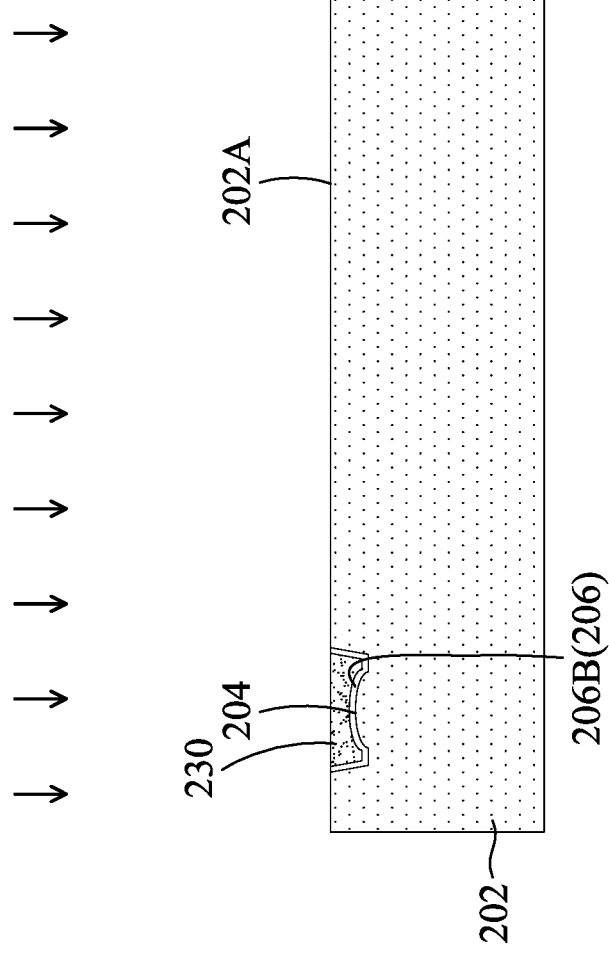

In FIG. 24, the patterned photosensitive dielectric material 230 is planarized (or thinned) using a planarization process (as indicated by the solid arrows in FIG. 24) such as a CMP process, a grinding process, or the like, in accordance with some embodiments. In some embodiments, the planarization process may remove excess portions of the photosensitive dielectric material 230 over the first portion 206A of the anti-reflection coating 206 so that the top surfaces of the first portion 206A of the anti-reflection coating 206 and the remaining photosensitive dielectric material 230 are substantially level or coplanar. In such cases, the anti-reflection coating 206 may act as a stop layer for the planarization process.

As described above, since the photosensitive dielectric material 230 deposited using a spin coating process has a reduced surface topography, and the planarization region can be pre-defined by a photopatterning process, process time and cost of the planarization process are reduced. Accordingly, the performance of the planarization process is improved.

In some embodiments shown in FIG. 24-1, after the photosensitive dielectric material 230 covering the first portion 206A of the anti-reflection coating 206 is planarized (i.e., removed), optionally, the first portion 206A of the anti-reflection coating 206 is further planarized (or thinned) using a planarization process (as indicated by the solid arrows in FIG. 24-1) such as a CMP process, a grinding process, or the like. The planarization process may expose the top surface 202A of the substrate 202 so that the top surface of the remaining photosensitive dielectric material 230 is flush with the top surface 202A of the substrate 202. In some embodiments, the planarization process for the first portion 206A of the anti-reflection coating 206 may be omitted, as in the embodiment shown in FIG. 24.

18

Figure 25:
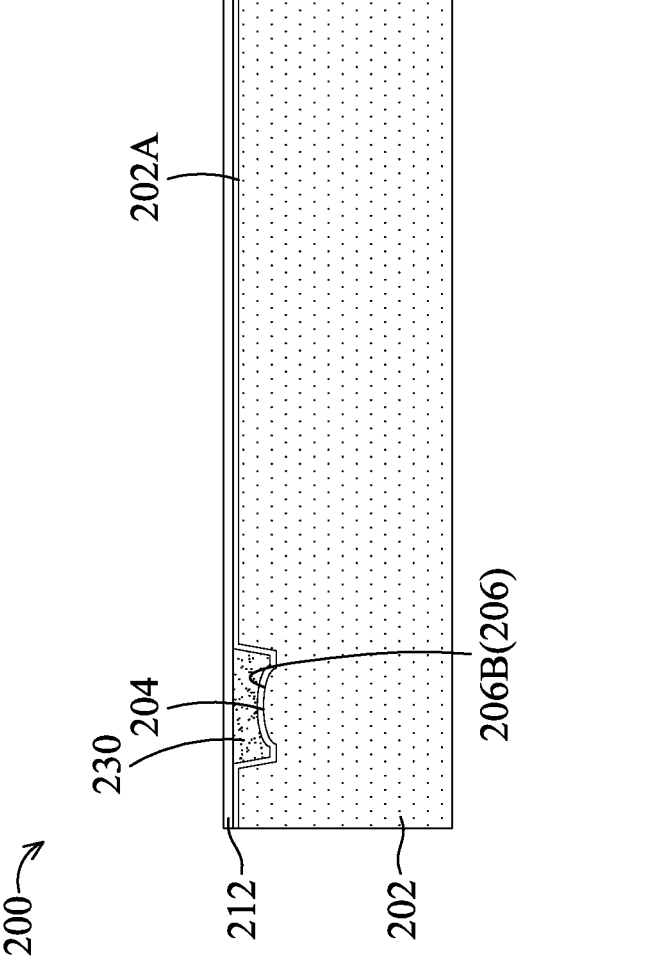
Figure 26:
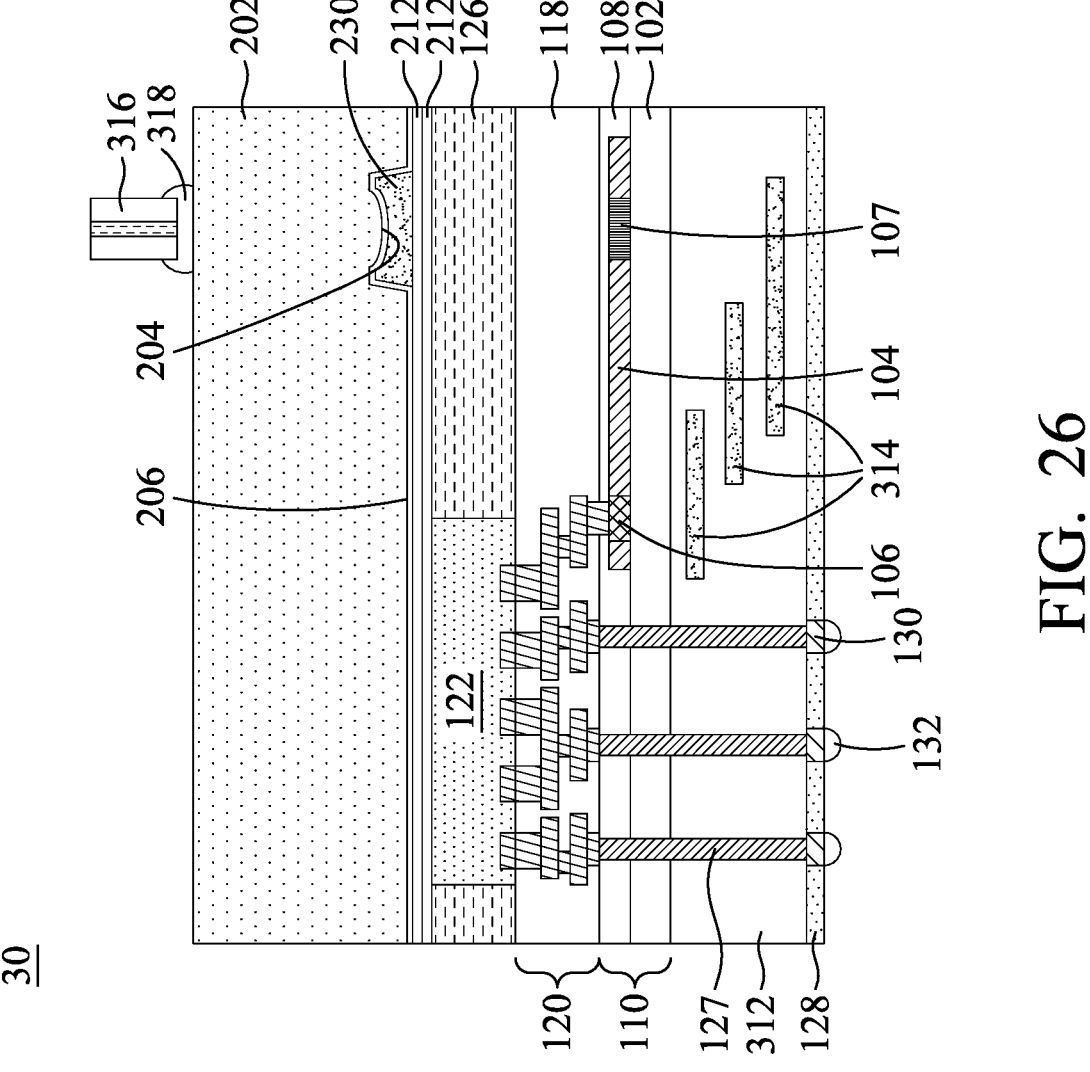

In FIG. 25, a bonding layer 212 (similar to the bonding layer 212 shown in FIG. 11) is deposited on the planarized photosensitive dielectric material 230 and over the top surface 202A of the substrate 202 (and on the first portion 206A of the anti-reflection coating 206, if present), thereby forming a second wafer 200, in accordance with some embodiments. The formation method of the bonding layer 212 may be similar to that described above for forming the bonding layer 212 shown in FIG. 11. Afterwards, similar fabrication processes as shown in FIGS. 12 to 16 are performed on the second wafer 200 to complete the formation of the photonic package 30 shown in FIG. 26.

It should be understood that the structures, configurations and the manufacturing methods described herein are only illustrative, and are not intended to be, and should not be construed to be, limiting to the present disclosure. Many alternatives and modifications will be apparent to those skilled in the art, once informed by the present disclosure. For example, it should be understood that the structure of the first semiconductor wafer 100 shown in FIG. 5 is merely an illustrative example, and is not intended to be, and should not be construed to be, limiting to the present disclosure. Other suitable structures of the first semiconductor wafer 100 may be used in different embodiments as long as there are optical components therein that can be aligned and optically coupled with the micro lenses 204 of the second wafer 200. These wafer structures are also within the contemplated scope of the present disclosure.

Embodiments of the present disclosure may achieve advantages. In some embodiments where the concave area of the micro lens may be filled with two dielectric materials layers, since the first dielectric material is first deposited in the concave area using a spin coating process (i.e., material-flowable process) rather than a CVD process (i.e., isotropic deposition process), it can effectively reduce the surface topography of the top surface of the substrate due to its fluidity. Accordingly, the subsequently deposited second dielectric material (e.g., by a CVD process) has a correspondingly reduced surface topography, helping to improve the performance of the subsequent planarization process (e.g., process time and cost are reduced). In some embodiments where the concave area of the micro lens may be filled with only a single photosensitive dielectric material deposited by a spin coating process, the photosensitive dielectric material can also effectively reduce the surface topography of the top surface of the substrate due to its fluidity, and the planarization region of the photosensitive dielectric material can be pre-defined by a photopatterning process. Therefore, the gap-filling process is simplified and performance of the subsequent planarization process is improved.

In accordance with some embodiments, a method of forming a semiconductor package is provided. The method includes forming a micro lens recessed from the top surface of a substrate. A concave area is formed between the surface of the micro lens and the top surface of the substrate. The method includes depositing a first dielectric material that fills a portion of the concave area using a spin coating process. The method includes depositing a second dielectric material that fills the remainder of the concave area and covers the top surface of the substrate using a chemical vapor deposition process. The method includes planarizing the second dielectric material. The method includes forming a bonding layer on the planarized second dielectric material and over the top surface of the substrate. The method includes bonding a semiconductor wafer to the substrate via the bonding layer.

In accordance with some embodiments, a method of forming a semiconductor package is provided. The method includes forming a micro lens recessed from the top surface of a substrate. A concave area is formed between the surface of the micro lens between the top surface of the substrate. The method includes depositing a dielectric material that fills the concave area and covers the top surface of the substrate using a spin coating process. The method includes patterning the dielectric material to leave only a portion of the dielectric material in the concave area using a photolithography process. The method includes planarizing the dielectric material that has been patterned. The method includes forming a bonding layer on the planarized dielectric material and over the top surface of the substrate. The method includes bonding a semiconductor wafer to the substrate via the bonding layer.

In accordance with some embodiments, a semiconductor package is provided. The semiconductor package includes a substrate, a micro lens, a first dielectric material, a second dielectric material, a bonding layer, and a semiconductor wafer. The micro lens is recessed from the top surface of the substrate, wherein a concave area is formed between the surface of the micro lens between the top surface of the substrate. The first dielectric material is disposed on the concave area and is close to the surface of the micro lens. The second dielectric material fills the concave area and is over the first dielectric material, wherein the second dielectric material is different from the first dielectric material. The bonding layer is formed over the top surface of the substrate and in direct contact with the second dielectric material. The semiconductor wafer is bonded to the bonding layer, wherein the semiconductor wafer includes an optical component therein.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of forming a semiconductor package, comprising:
   forming a micro lens recessed from a top surface of a substrate, wherein a concave area is formed between a surface of the micro lens and the top surface of the substrate;
   depositing a first dielectric material that fills a portion of the concave area using a spin coating process;
   depositing a second dielectric material that fills a remainder of the concave area and covers the top surface of the substrate using a chemical vapor deposition process;
   planarizing the second dielectric material;
   forming a bonding layer on the planarized second dielectric material and over the top surface of the substrate; and
   bonding a semiconductor wafer to the substrate via the bonding layer.

2. The method as claimed in claim 1, wherein the first dielectric material comprises silicon, carbon, and oxygen.

3. The method as claimed in claim 1, wherein the second dielectric material comprises silicon and oxygen.

4. The method as claimed in claim 1, wherein depositing the first dielectric material comprises only partially filling the concave area with the first dielectric material.

5. The method as claimed in claim 1, wherein depositing the first dielectric material comprises partially filling the concave area and covering the top surface of the substrate with the first dielectric material, and
   wherein depositing the second dielectric material comprises filling the remainder of the concave area and covering the first dielectric material over the top surface of the substrate with the second dielectric material.

6. The method as claimed in claim 5, wherein planarizing the second dielectric material comprises planarizing the second dielectric material so that the first dielectric material over the top surface of the substrate is exposed and a top surface of the first dielectric material is level with a top surface of the second dielectric layer.

7. The method as claimed in claim 1, further comprising:
   depositing an anti-reflection coating conformally on the surface of the micro lens, sidewalls of the concave area, and the top surface of the substrate, before the first dielectric material and the second dielectric material are deposited.

8. The method as claimed in claim 7, wherein planarizing the second dielectric material comprises planarizing the second dielectric material so that the anti-reflection coating over the top surface of the substrate is exposed.

9. The method as claimed in claim 8, further comprising:
   thinning the anti-reflection coating so that the top surface of the substrate is exposed, after planarizing the second dielectric material.

10. The method as claimed in claim 1, wherein the semiconductor wafer includes an optical component therein, and
    wherein after bonding the semiconductor wafer, the optical component is aligned with the micro lens.

11. A method of forming a semiconductor package, comprising:
    forming a micro lens recessed from a top surface of a substrate, wherein a concave area is formed between a surface of the micro lens and the top surface of the substrate;
    depositing a dielectric material that fills the concave area and covers the top surface of the substrate using a spin coating process;
    patterning the dielectric material to leave only a portion of the dielectric material in the concave area using a photolithography process;
    planarizing the dielectric material that has been patterned;
    forming a bonding layer on the planarized dielectric material and over the top surface of the substrate; and
    bonding a semiconductor wafer to the substrate via the bonding layer.

12. The method as claimed in claim 11, wherein the dielectric material is a photosensitive dielectric material and comprises silicon, carbon, oxygen, and photosensitive additives.

13. The method as claimed in claim 11, further comprising:
    depositing an anti-reflection coating conformally on the surface of the micro lens, sidewalls of the concave area, and the top surface of the substrate, before the dielectric material is deposited.

14. The method as claimed in claim 13, wherein planarizing the dielectric material comprises planarizing the dielectric material so that the anti-reflection coating over the top surface of the substrate is exposed.

15. The method as claimed in claim 14, wherein after planarizing the dielectric material, the method further comprises thinning the anti-reflection coating so that the top surface of the substrate is exposed.

16. A method of forming a semiconductor package, comprising:

forming a micro lens recessed from a top surface of a substrate, wherein a concave area is formed between a surface of the micro lens and the top surface of the substrate;

depositing a first gap-fill material that fills a portion of the concave area, wherein the first gap-fill material is deposited by a spin coating process;

depositing a second gap-fill material that fills a remainder of the concave area and covers the top surface of the substrate, wherein the second gap-fill material is different from the first gap-fill material;

planarizing the second gap-fill material;

forming a bonding layer on the planarized second gap-fill material and over the top surface of the substrate; and bonding a semiconductor wafer to the substrate via the bonding layer.

17. The method as claimed in claim 16, wherein the second gap-fill material is deposited by a chemical vapor deposition process.

18. The method as claimed in claim 16, wherein depositing the first gap-fill material comprises partially filling the concave area and covering the top surface of the substrate with the first gap-fill material, and wherein depositing the second gap-fill material comprises filling the remainder of the concave area and covering the first gap-fill material over the top surface of the substrate with the second gap-fill material.

19. The method as claimed in claim 18, wherein planarizing the second gap-fill material comprises planarizing the second gap-fill material so that the first gap-fill material over the top surface of the substrate is exposed and a top surface of the first gap-fill material is level with a top surface of the second gap-fill layer.

20. The method as claimed in claim 19, wherein the bonding layer is in direct contact with both the first gap-fill material and the second gap-fill material.

* * * * *